(12) United States Patent
Bernhardt

(10) Patent No.: US 11,518,508 B2
(45) Date of Patent: ***Dec. 6, 2022

(54) ROBUST AMPHIBIOUS AIRCRAFT

(71) Applicant: The Boeing Company, Chicago, IL (US)

(72) Inventor: Roger D. Bernhardt, OFallon, MO (US)

(73) Assignee: The Boeing Company, Chicago, IL (US)

(*) Notice: Subject to any disclaimer, the term of this patent is extended or adjusted under 35 U.S.C. 154(b) by 203 days.

This patent is subject to a terminal disclaimer.

(21) Appl. No.: 16/856,684

(22) Filed: Apr. 23, 2020

(65) Prior Publication Data

US 2020/0255137 A1   Aug. 13, 2020

Related U.S. Application Data

(62) Division of application No. 15/452,564, filed on Mar. 7, 2017, now Pat. No. 10,676,187.

(51) Int. Cl.
| | |
|---|---|
| *B64C 29/00* | (2006.01) |
| *B64C 37/00* | (2006.01) |
| *B64C 25/54* | (2006.01) |
| *B64C 35/00* | (2006.01) |
| *B64C 3/56* | (2006.01) |
| *B64C 39/04* | (2006.01) |
| *B64C 39/02* | (2006.01) |
| *B64C 29/02* | (2006.01) |
| *B60F 5/00* | (2006.01) |

(52) U.S. Cl.
CPC ............ *B64C 29/0033* (2013.01); *B60F 5/00* (2013.01); *B64C 3/56* (2013.01); *B64C 25/54* (2013.01); *B64C 29/0025* (2013.01); *B64C 29/02* (2013.01); *B64C 35/00* (2013.01); *B64C 35/008* (2013.01); *B64C 37/00* (2013.01); *B64C 39/024* (2013.01); *B64C 39/04* (2013.01); *B64C 2201/021* (2013.01); *B64C 2201/102* (2013.01); *B64C 2201/108* (2013.01)

(58) Field of Classification Search
CPC ....... B64C 3/56; B64C 29/0033; B64C 35/00; B64C 35/001; B64C 35/002; B64C 35/008; B64C 37/00; B60F 5/02
See application file for complete search history.

(56) References Cited

U.S. PATENT DOCUMENTS 2,256,918 A * 9/1941 Young ..................... B64C 27/28
  416/115
2,961,189 A * 11/1960 Doak .................. B64C 29/0033
  244/12.4

(Continued)

OTHER PUBLICATIONS

Waters, Hannah. "Flip: The Floating Instrument Platform." FLIP: The FLoating Instrument Platform. The Smithsonian Institution, Jul. 2012. https://ocean.si.edu/human-connections/exploration/flip-floating-instrument-platform.*

*Primary Examiner* — Joseph W Sanderson
(74) *Attorney, Agent, or Firm* — Felix L. Fischer

(57) ABSTRACT

A robust amphibious air vehicle incorporates a fuselage with buoyant stabilizers and wings extending from the fuselage. At least one lift fan is mounted in the fuselage. Movable propulsion units carried by the wings are rotatable through a range of angles adapted for vertical and horizontal flight operations.

18 Claims, 24 Drawing Sheets

(56) References Cited

U.S. PATENT DOCUMENTS

| | | | | |
|---|---|---|---|---|
| 3,136,499 A * | 6/1964 | Kessler | B64C 11/34 | 244/7 C |
| 3,321,158 A * | 5/1967 | Di Stasi | B64C 29/0091 | 244/105 |
| 4,691,878 A * | 9/1987 | Vaughan | B64C 3/56 | 416/142 |
| 6,786,450 B1 * | 9/2004 | Einstein | B64C 3/56 | 244/45 R |
| 6,997,413 B2 * | 2/2006 | Wukowitz | B64C 9/02 | 244/91 |
| 7,040,210 B2 * | 5/2006 | Richards | F42B 10/14 | 244/3.29 |
| 8,162,253 B2 * | 4/2012 | Seiford, Sr. | B64C 29/0025 | 244/7 R |
| 8,387,913 B2 * | 3/2013 | Karem | B64C 3/56 | 244/54 |
| 9,493,235 B2 * | 11/2016 | Zhou | B60F 5/02 | |
| 10,059,436 B1 * | 8/2018 | Robertson | B64C 35/00 | |
| 10,099,770 B2 * | 10/2018 | Gionta | B64C 35/008 | |
| 10,399,673 B1 * | 9/2019 | Roop | B64C 3/30 | |
| 10,676,187 B2 * | 6/2020 | Bernhardt | B64C 39/04 | |
| 11,230,363 B2 * | 1/2022 | Klein | B64C 37/00 | |
| 2002/0125367 A1 * | 9/2002 | Killingsworth | B60F 3/00 | 244/17.11 |
| 2002/0195518 A1 * | 12/2002 | Killingsworth | B64C 35/008 | 244/7 A |
| 2005/0236520 A1 * | 10/2005 | Wukowitz | B64C 35/008 | 244/105 |
| 2010/0044506 A1 * | 2/2010 | Smith | B64C 25/10 | 244/101 |
| 2011/0042507 A1 * | 2/2011 | Seiford, Sr. | B64C 37/00 | 244/2 |
| 2015/0274289 A1 * | 10/2015 | Newman | B64C 29/0008 | 244/12.4 |
| 2016/0114887 A1 * | 4/2016 | Zhou | G06Q 20/367 | 348/148 |
| 2016/0185444 A1 * | 6/2016 | Gionta | B64C 35/008 | 244/49 |
| 2016/0214710 A1 * | 7/2016 | Brody | B64C 27/28 | |
| 2016/0243910 A1 * | 8/2016 | Hu | B60F 5/02 | |
| 2017/0003690 A1 * | 1/2017 | Tanahashi | G05D 1/102 | 416/115 |
| 2017/0152935 A1 * | 6/2017 | Filter | F16H 57/025 | |
| 2017/0183093 A1 * | 6/2017 | Bialek | B64C 37/00 | |
| 2018/0312251 A1 * | 11/2018 | Petrov | B64C 29/0033 | |
| 2018/0346112 A1 * | 12/2018 | Chiang | B64C 29/0033 | |
| 2019/0351996 A1 * | 11/2019 | Livieratos | B64C 11/30 | |
| 2021/0380235 A1 * | 12/2021 | Livieratos | B64C 37/00 | |

\* cited by examiner

ROBUST AMPHIBIOUS AIRCRAFT

REFERENCES TO RELATED APPLICATIONS

This application is a divisional of U.S. application Ser. No. 15/452,564 filed on Mar. 7, 2017 entitled ROBUST AMPHIBIOUS AIRCRAFT, having a common assignee with the present application, the disclosure of which is incorporated herein by reference.

BACKGROUND INFORMATION

Field

Embodiments of the disclosure relate generally to amphibious aircraft and more particularly to an aircraft operable as an unmanned air vehicle (UAV) with horizontal takeoff/landing or vertical takeoff/landing capability and enhanced water stability for a perched condition in high sea state conditions.

Background

The surface of the earth is over 71% water resulting in huge maritime areas to service for transportation, military operational needs and search and rescue as well as interacting with objects on the sea surface including recovery. Historically and currently there have been very effective amphibious aircraft that were able to provide long range overwater transportation and search as well as sea landing/takeoff for interaction with objects on the sea surface. However, there have been no vehicle systems that can address the full range and conditions that occur, specifically long range flight and long term loiter at sea with the capability to accommodate high sea states and maintain operational capability without damage.

It is therefore desirable to provide an air vehicle system which accommodates these requirements.

SUMMARY

Exemplary embodiments provide a robust amphibious air vehicle having a fuselage with buoyant stabilizers and wings extending from the fuselage. At least one lift fan is mounted in the fuselage. Movable propulsion units carried by the wings are rotatable through a range of angles adapted for vertical and horizontal flight operations.

The embodiment disclosed provide a method for operation of a robust amphibious air vehicle wherein the air vehicle is deployed from a home station in Vertical Takeoff. The air vehicle transitions to horizontal flight and dashes to a remote location. Assets are deployed and the air vehicle lands on the water surface. The air vehicle then loiters on the water in a perched condition. The air vehicle may then take off to monitor assets in flight, recover or deploy assets from/to the sea surface with reduced time hover; and return to home station.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments described herein provide a robust amphibious air vehicle that has vertical flight capability for shipboard operations (landing and takeoff), winged operations to offer extended ranges, folding or robust configuration to perch on the sea like a lifeboat or stabilized platform and provide an air vehicle with capability for motion compensated recovery of surface articles.

Figure 1A:
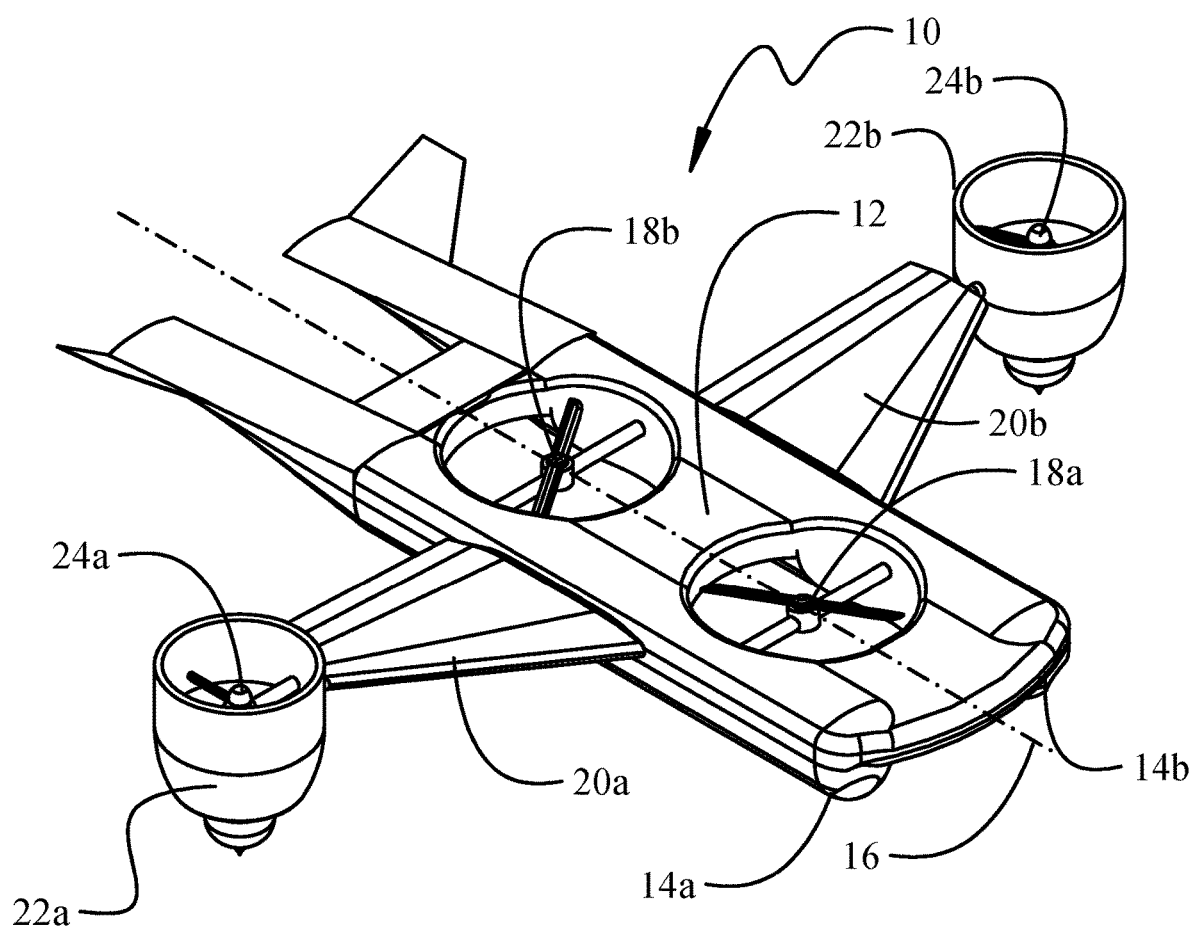
FIG. 1A is a downward pictorial representation of the air vehicle in hovering operation.
Figure 1B:
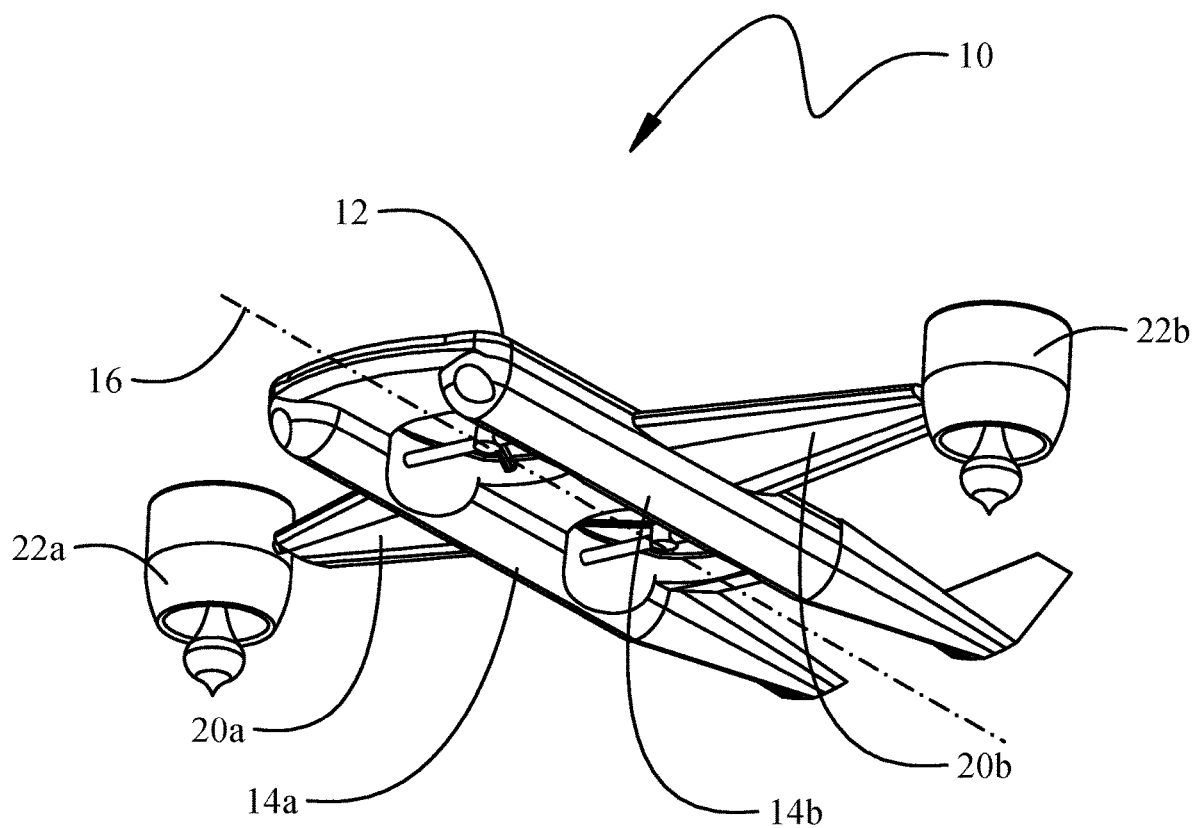
FIG. 1B is an upward pictorial representation of the air vehicle in hovering operation.
Figure 1C:
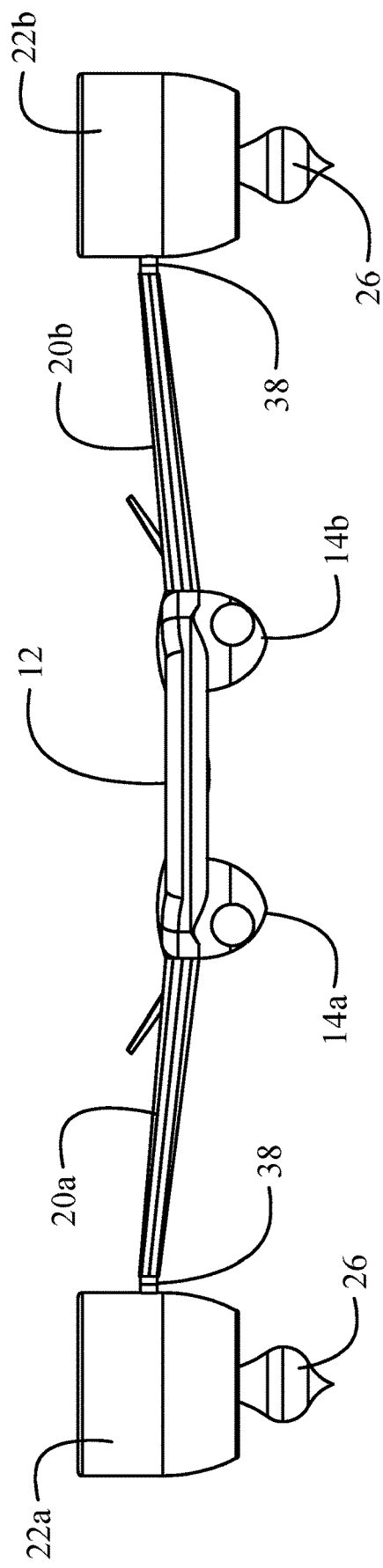
FIG. 1C is a front view of the air vehicle in hovering operation.
Figure 1D:
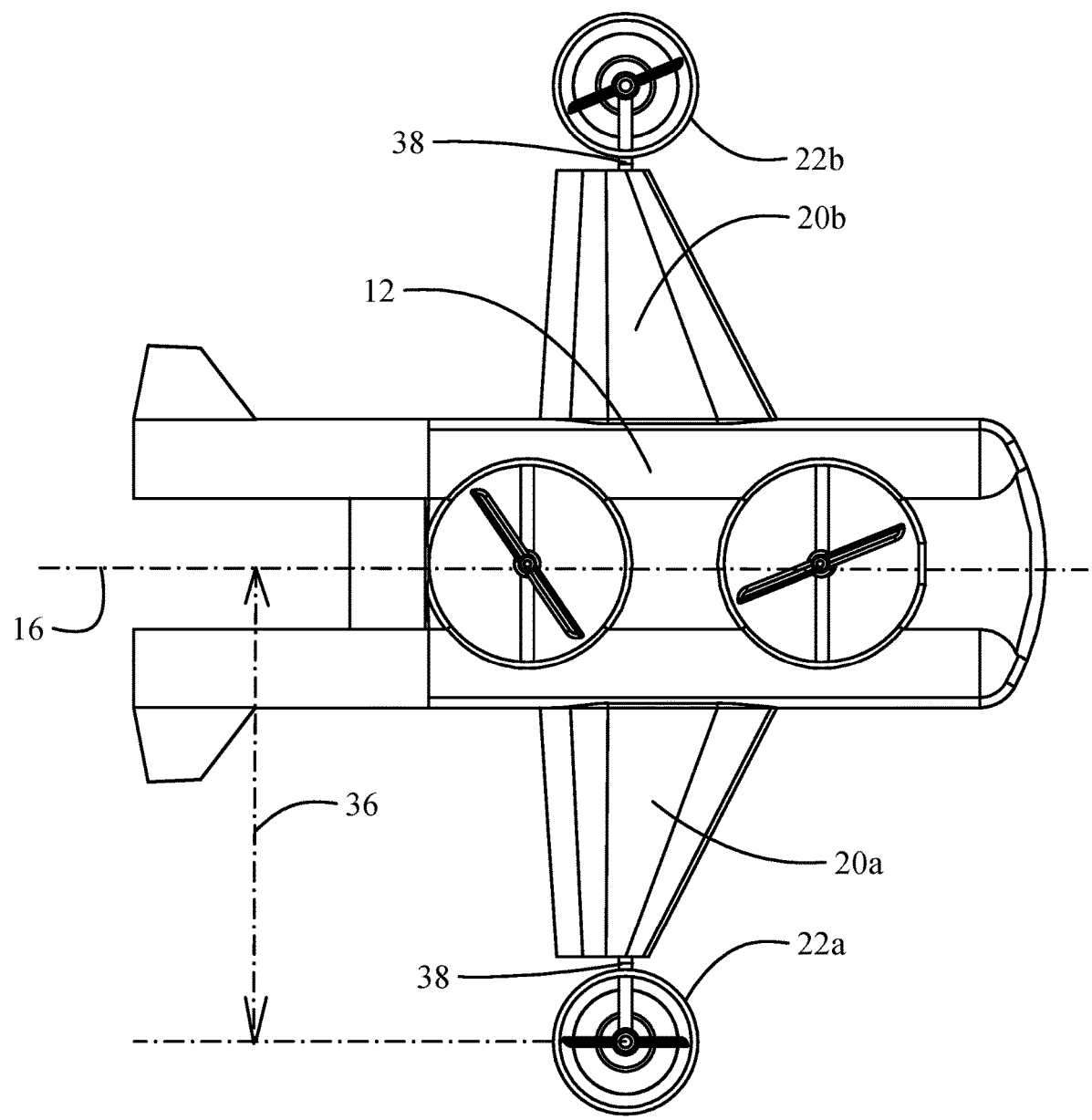
FIG. 1D is a top view of the air vehicle in hovering operation.
Figure 1E:
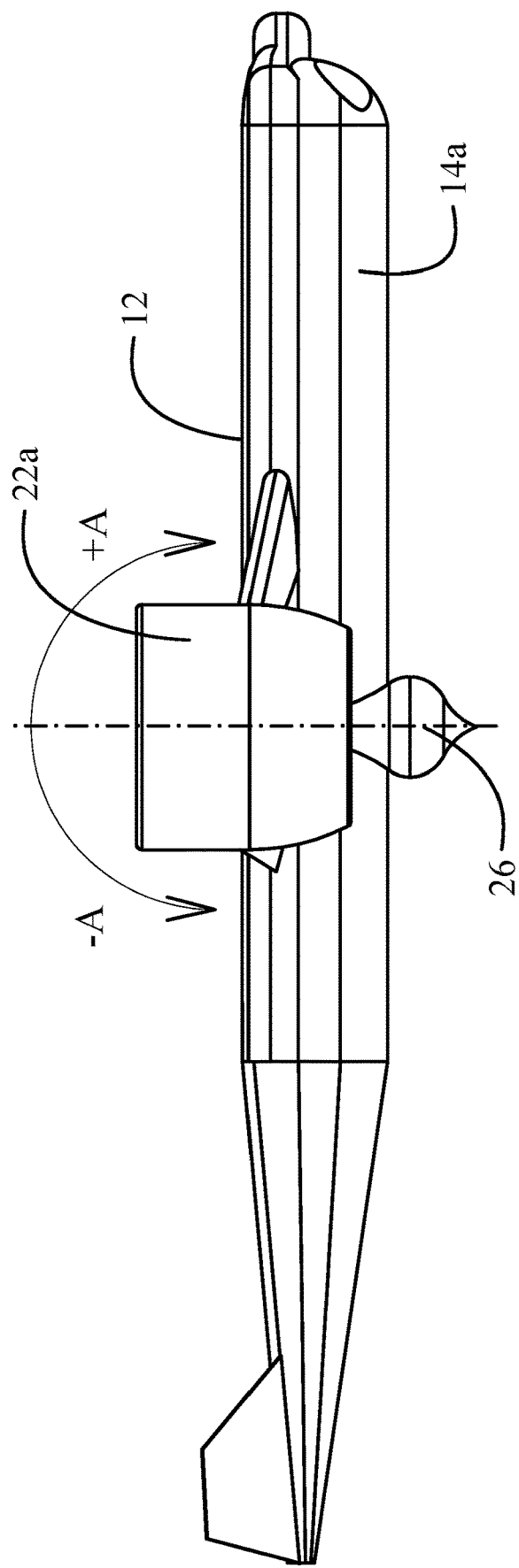
FIG. 1E is a side view of the air vehicle in hovering operation.
Figure 2:
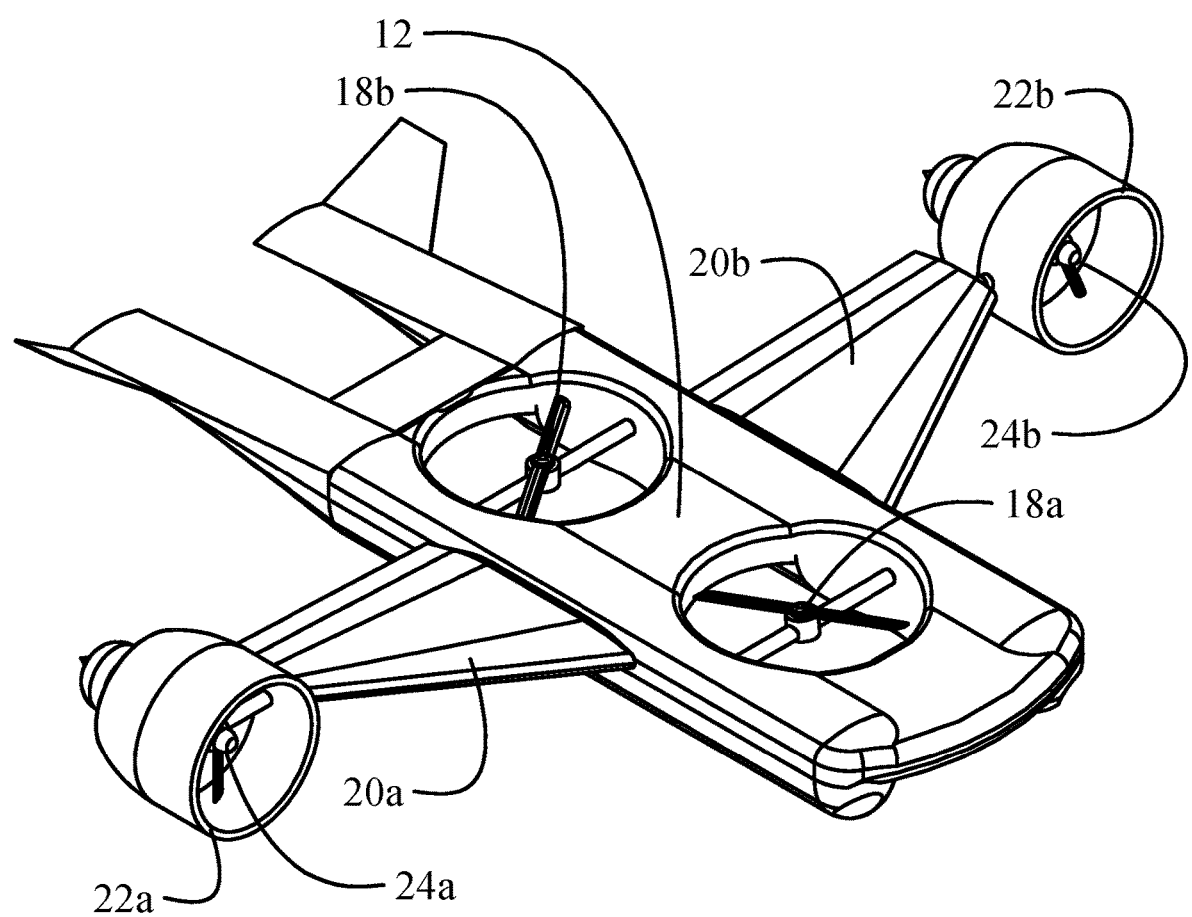
FIG. 2 is a downward pictorial representation of the air vehicle configured for horizontal flight.

Referring to the drawings, FIGS. 1A through 1E disclose a first embodiment of a robust amphibious air vehicle 10. The air vehicle 10 incorporates a fuselage 12 having buoyant stabilizers, in the exemplary embodiment pontoons 14 laterally displaced from a centerline 16 at the lateral extents of the fuselage. While two pontoons are shown in the exemplary embodiments multiple pontoons on each side of the fuselage may be employed. To accommodate desired vertical take-off and landing capability at least one lift fan is mounted in the fuselage 12. For the embodiment shown, two lift fans 18a and 18b, longitudinally spaced on the centerline 16, are employed. Use of two lift fans allows pitch control in vertical or hovering operations with variable relative thrust in the fans. Wings 20a and 20b extend from the fuselage 12 for lift carrying capability in horizontal flight to provide extended range and speed capability for the air vehicle. Movable propulsion units, wingtip mounted ducted fans 22a and 22b for the exemplary embodiment, provide additional lift in a first vertical position as shown in FIGS. 1A and 1B and are rotatable through a range of angles, +A through −A, and from the vertical to a horizontal position as shown in FIG. 2 to provide thrust for horizontal flight. Angle and thrust variation of the ducted fans 22a, 22b allows yaw and roll control in vertical or hovering operations. Winged flight operation with the ducted fans 22a, 22b in the horizontal position allows higher speeds and longer range operation than a pure rotorcraft with the capability for low speed, low energy consumption loiter with aerodynamic lift. While shown as mounted to the wingtips in the exemplary embodiment, the movable propulsion units may be supported within the wing planform in alternative embodiments.

Ducted fans 22a and 22b are employed in the exemplary embodiment not only for aerodynamic efficiency but for shielding of the propulsion rotors 24a and 24b during water operation. However, in alternative embodiments unducted tilt-rotors may be employed. Additionally, use of teetering rotor systems or controllable rigid rotor systems in the wing mounted fans and/or lift fans with cyclic control may be employed for additional control capability in vertical or hovering operations.

Figure 3:
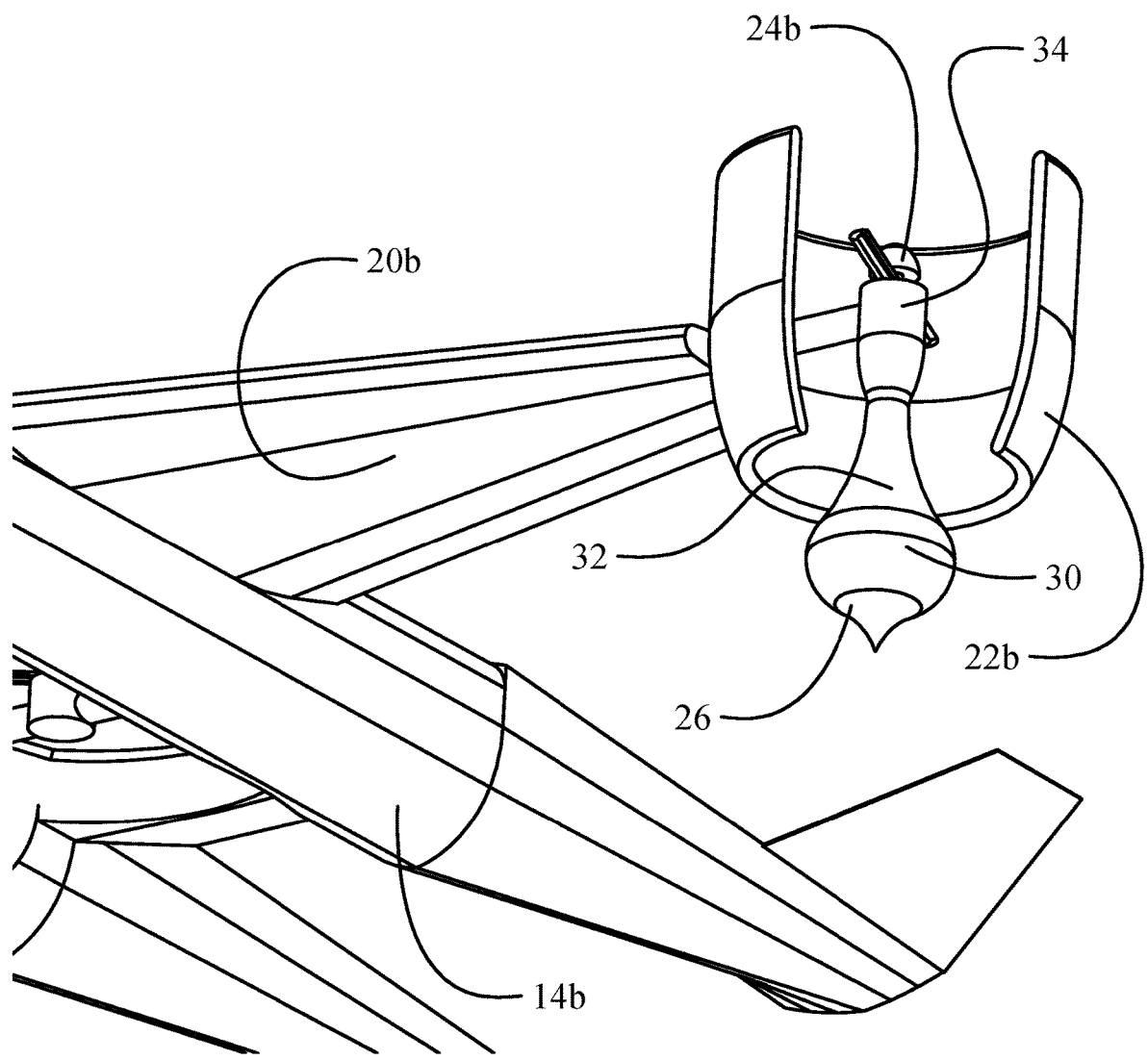
FIG. 3 is a detailed view with the ducted fan partially sectioned.

The ducted fans 22a, 22b for the exemplary embodiment incorporate supplemental buoyancy elements 26. The supplemental buoyancy elements 26 are mounted on a centerline 28 of the propulsion fans 24a, 24b downstream of the fan discs as seen in FIG. 1B and shown in detail in FIG. 3. A buoyant chamber 30 is supported by a connecting strut 32 which may be an extension of the engine/motor nacelle 34 of the propulsion rotor 24a, 24b. In alternative embodiments the supplemental buoyancy elements may extend from or be incorporated in the aft periphery of the duct of the ducted fans 22a, 22b The supplemental buoyancy elements 26 provide flotation to assist in maintaining the ducted fans 22a, 22b out of the water and, additionally, by their location at or near the wingtips provides an extended lateral moment arm 36 (best seen in FIG. 1D) from the vehicle centerline 16 for enhanced roll stability of the air vehicle 10 in the water. While vertical takeoff and landing are anticipated as a normal water operational mode the shoulder mounted configuration of the wings in the exemplary embodiment allows clearance of the ducted fans 22a, 22b in the horizontal operational configuration to allow horizontal takeoff and landing of the air vehicle 10 on the water.

Figure 4A:
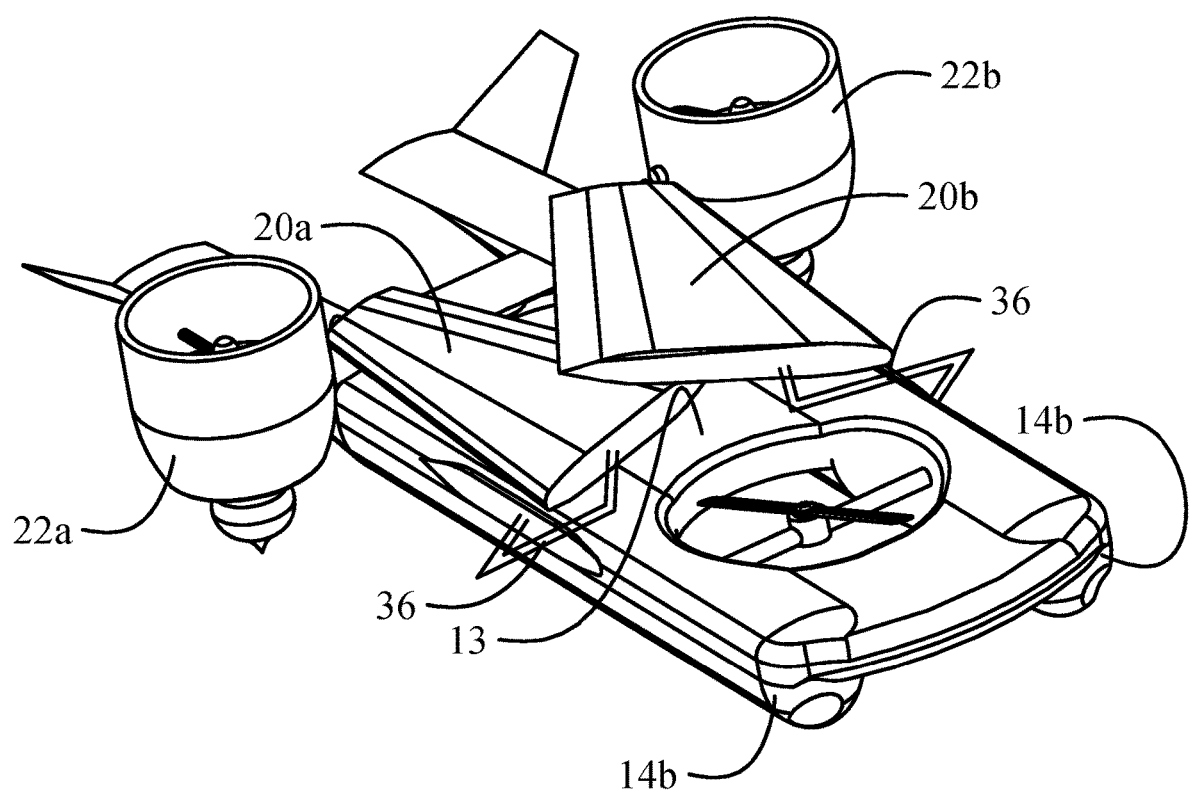
FIG. 4A is a representation of the air vehicle with the wings in a first top folded configuration.

The air vehicle 10 is specifically adapted to remain "perched", floating on the water, for extended periods of time to allow deployment at remote dispersed locations without the need for loitering in flight. The highly stable nature of the fuselage arrangement while on the water with buoyant stabilizers such as pontoons 14a, 14b and additional stabilization with the supplemental buoyancy elements 26 may be further enhanced for survivability in high sea states by providing wing folding mechanisms. As represented in FIG. 4A, the wings may be folded onto the top or deck 13 of the fuselage 12 using articulating mechanisms 36. Actuatable universal joints 38 (best seen in FIGS. 1C and 1D) may be employed in mounting the ducted fans 22a, 22b to the wingtips such that, in addition to the articulation for hovering control and transition to horizontal flight, rotation with respect to the wings 20a, 20b is allowed such that the fans and the supplemental buoyancy elements 26 remain adjacent the pontoons 14a, 14b with the wings in the folded condition. For the fuselage top wing fold, this secondary plane of rotation for the fans is substantially parallel to the wing chord.

Figure 4B:
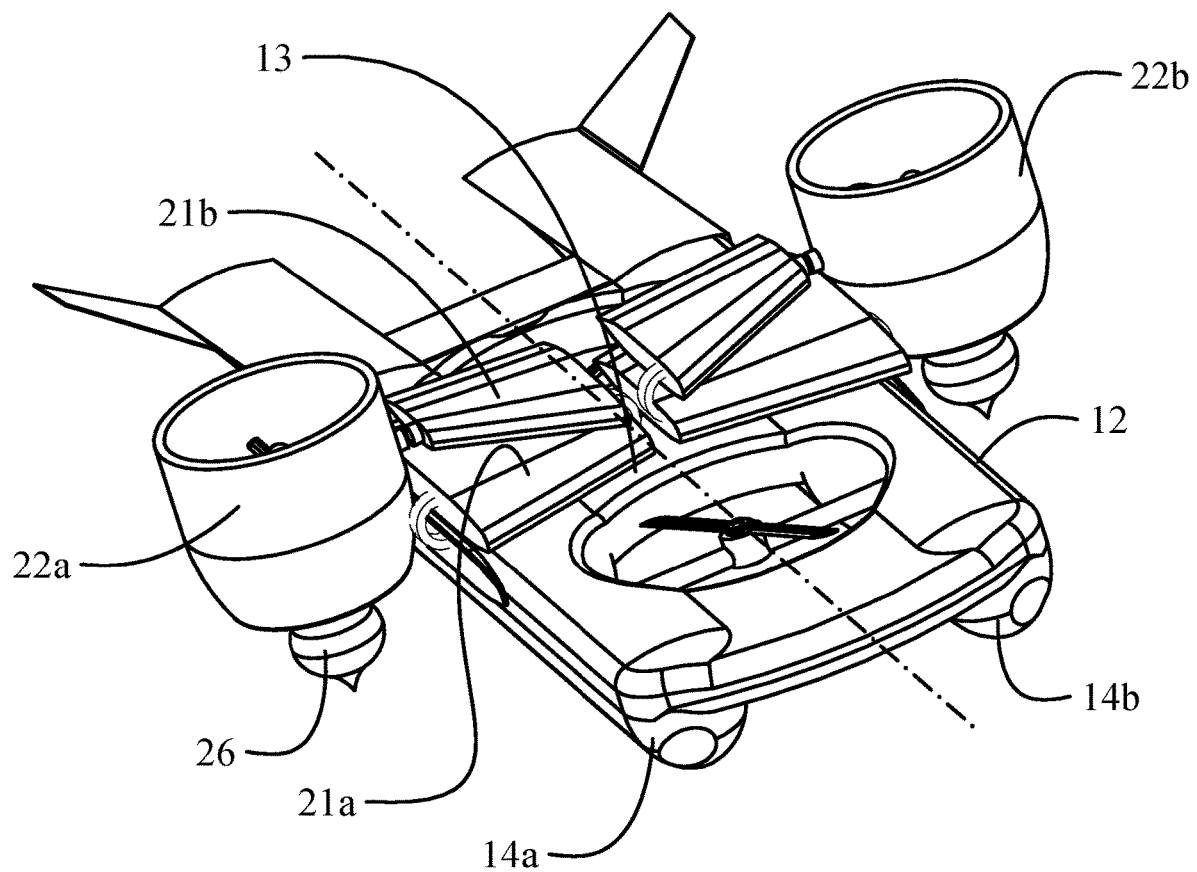
FIG. 4B is a representation of the air vehicle with the wings in a second top folded configuration.

FIG. 4B shows an alternative top folding mechanism wherein the wings 20a, 20b are bifurcated on a midspan chord for first folding elements 21a, folding inward onto the deck 13 of the fuselage 12, and second folding elements 21b, folding outboard back onto the first folding elements. This configuration avoids the requirement for rotation of the ducted fans 22a, 22b, naturally placing the fans adjacent the sides of the fuselage.

Figure 5:
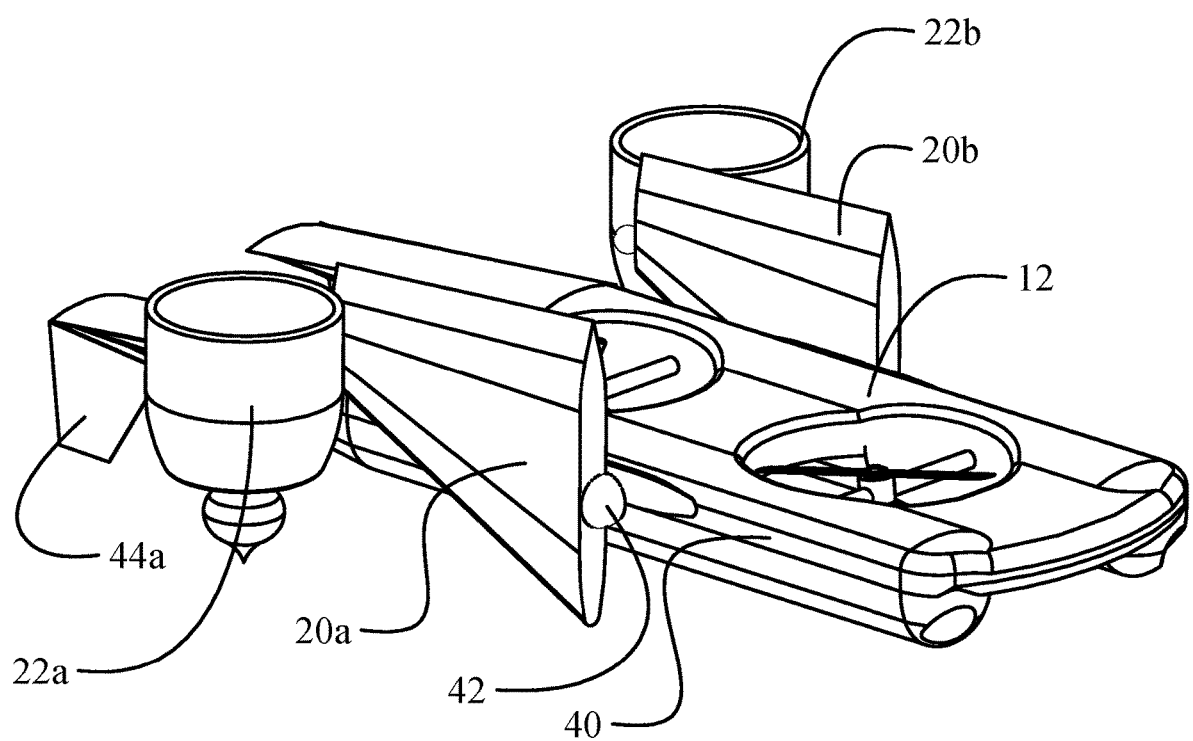
FIG. 5 is a representation of the air vehicle with the wings in a side folded configuration.
Figure 6:
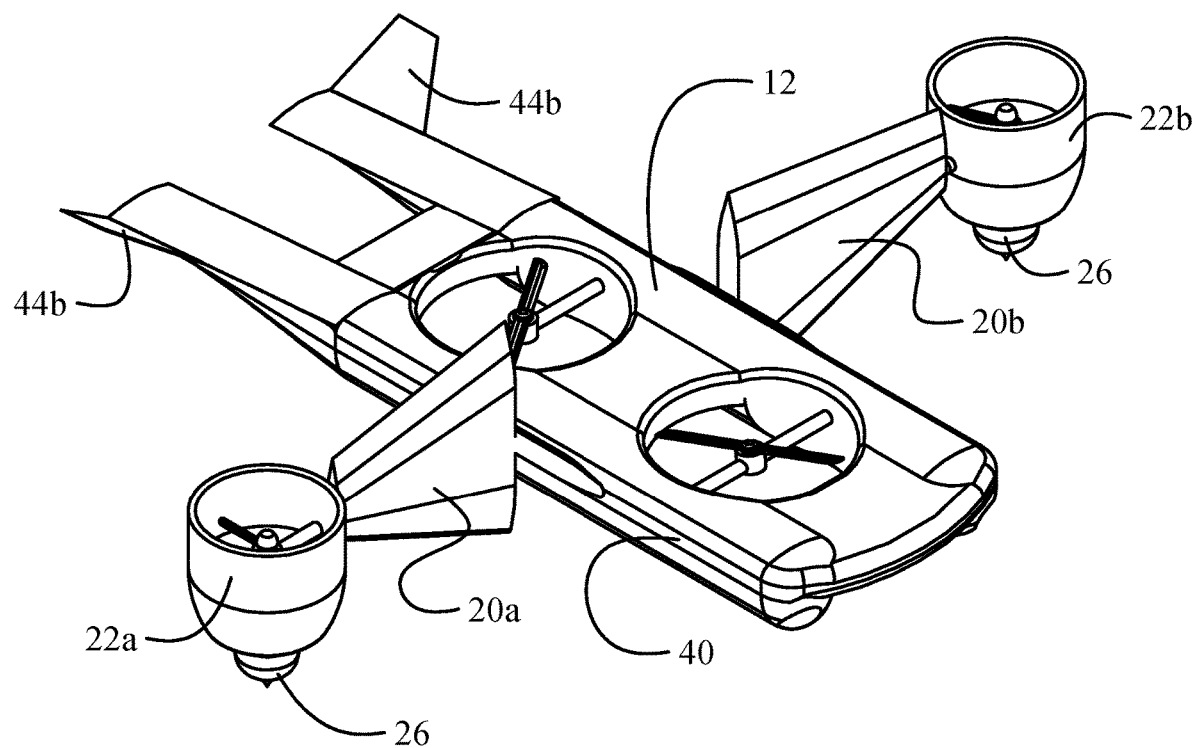
FIG. 6 is a representation of the air vehicle with the wings in a first transition stage to a side folded configuration.

In an alternative embodiment, the wings 20a, 20b may be rotated for folding against sides 40 of the fuselage 12 as represented in FIG. 5. Articulating mechanisms 42 allow rotation of the wings 20a, 20b through a first 90-degree rotation as shown in FIG. 6 followed by a second perpendicular 90-degree rotation to the position of FIG. 5. As in the prior embodiment, actuatable universal joints 38 allow rotation of the ducted fans 22a, 22b such that the fans and the supplemental buoyancy elements 26 remain adjacent the pontoons 14a, 14b with the wings in the folded condition. However, in this embodiment, the actuatable universal joints 38 rotate the ducted fans in a plane substantially perpendicular to the wing chord.

As also seen in FIGS. 5 and 6, the pitch/yaw control surfaces 44a, 44b are deflectable to a downward orientation to act as directional rudders or stabilizers when the air vehicle 10 is on the water. For the embodiment shown, two pitch/yaw control surfaces 44a and 44b are employed in a "ruddervator" configuration. In alternative embodiments with a vertical control surface and horizontal surfaces mounted on the empennage, the horizontal surfaces may be deflected downward for the water rudder or stabilizer configuration.

Figure 7A:
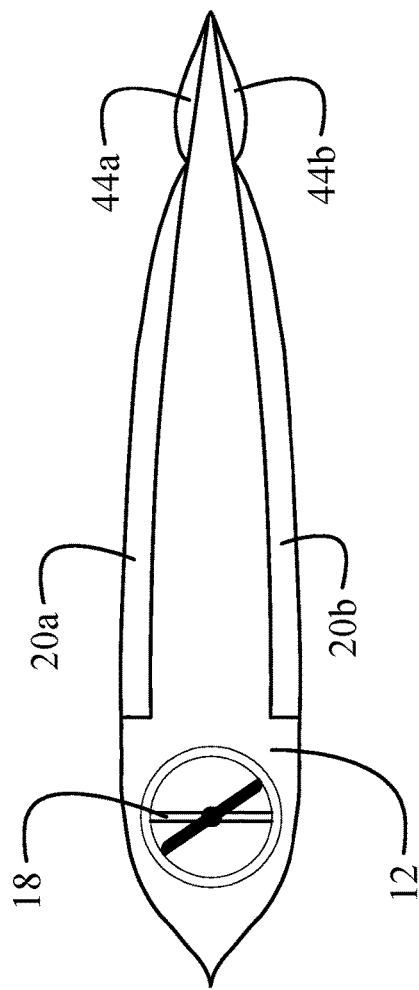
FIGS. 7A and 7B are a top view and side view representation of an alternative embodiment of the air vehicle with conformal engagement of side folded wings.
Figure 7B:
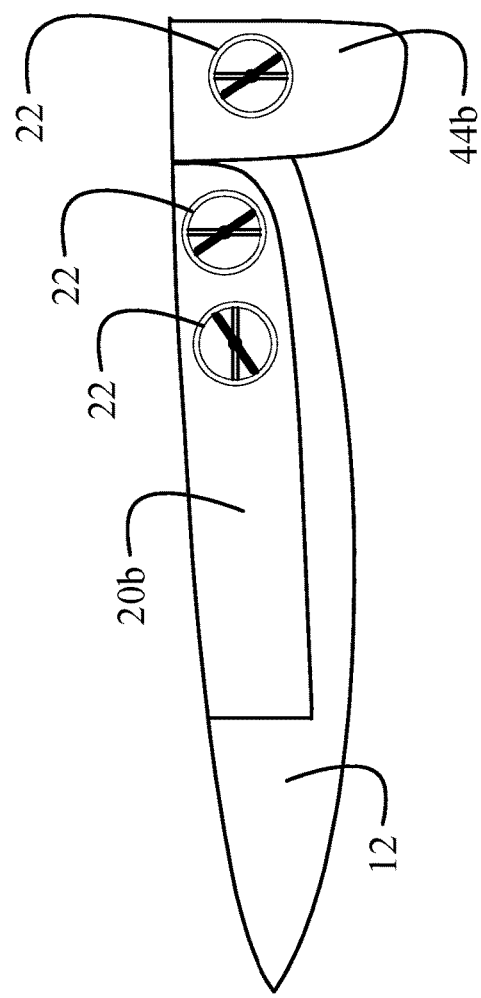

In alternative embodiments, particularly with the ducted fans mounted within the wing planform, a reduced chord length in the wings and/or increased depth of the fuselage allows conformal engagement of the wings and fuselage as shown in FIGS. 7A and 7B.

Figure 8:
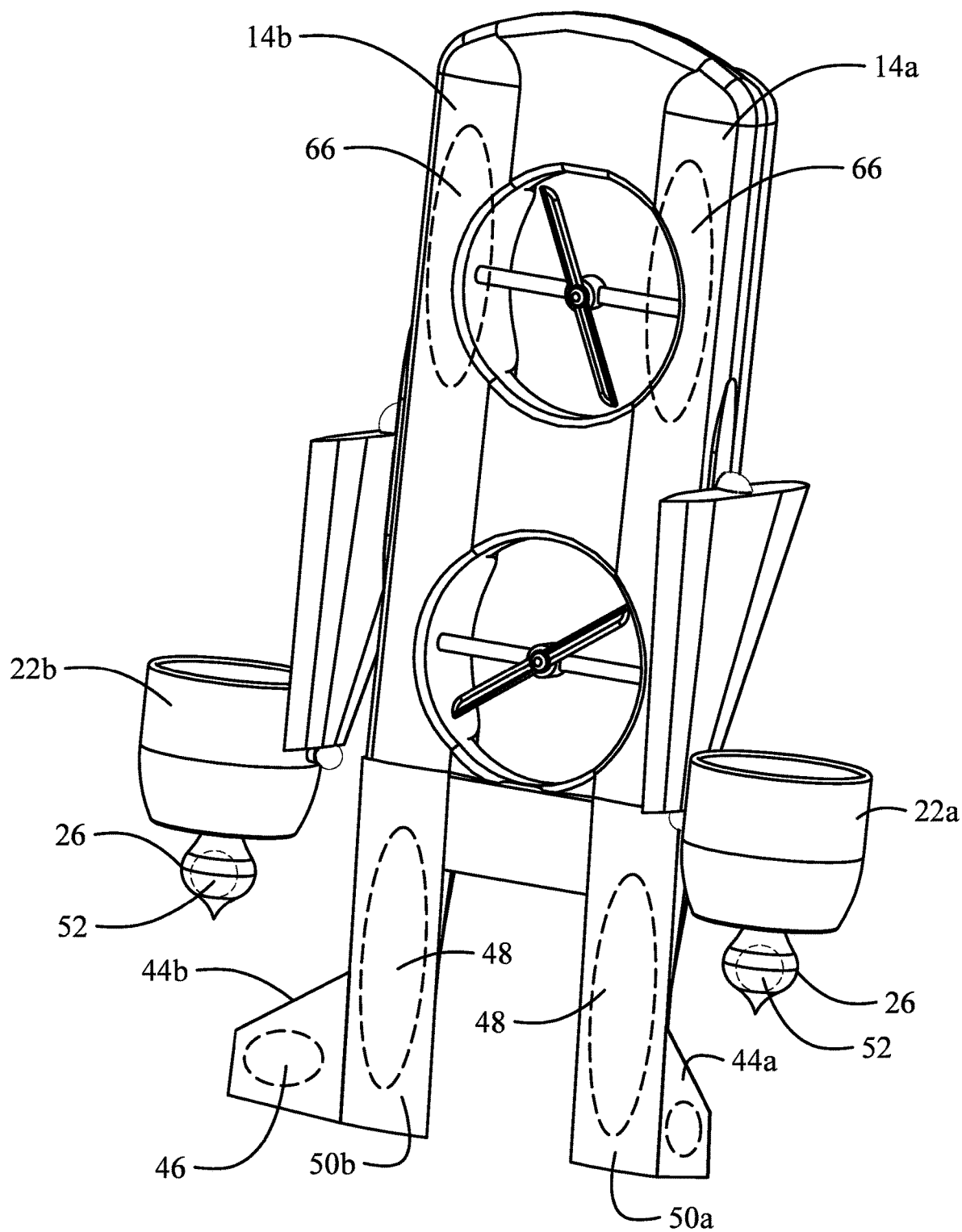
FIG. 8 is a representation of the air vehicle partially submerged in a pogo configuration.
Figure 9:
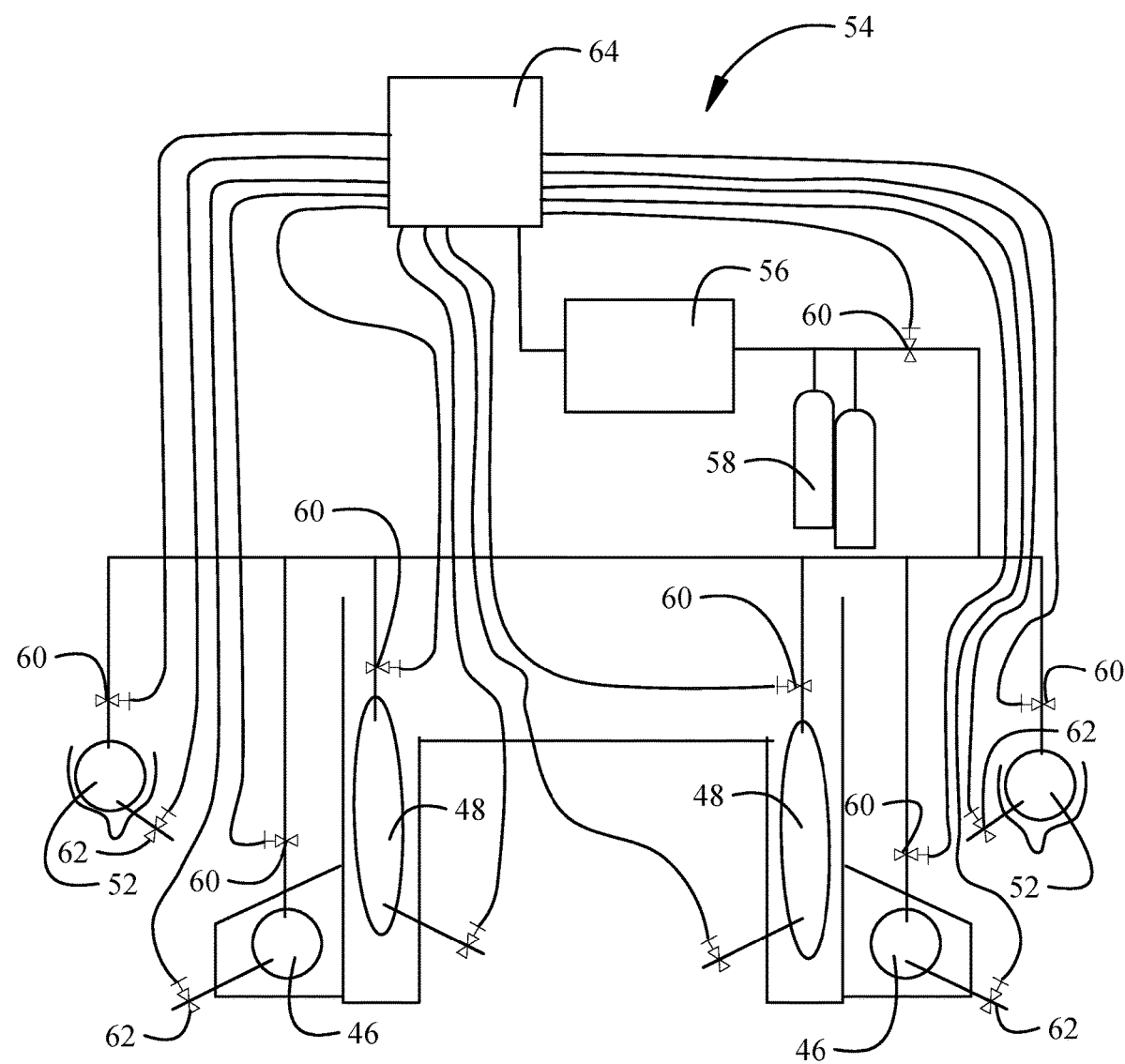
FIG. 9 is a block diagram of a ballast control system.

Survivability of the air vehicle 10 when loitering on the water in high sea states may be further enhanced by at least partially submerging the vehicle. Structures which are partially submerged in an orientation substantially vertical to the ocean surface (a "pogo" orientation) have been shown to be highly stable and resistant to damage in high seas. The air vehicle 10 may be equipped with fillable ballast tanks 46 in the pitch/yaw control surfaces 44a, 44b, ballast tanks 48 in the empennage (in the present embodiments the aft portions 50a and 50b of the pontoons 14a, 14b) and ballast tanks 52 in the supplemental buoyancy elements 26 as represented in FIG. 8. A ballast control system 54 as shown in FIG. 9 interconnected to the ballast tanks allows filling of the ballast tanks to reorient the air vehicle 10 to a vertical position as seen in FIG. 8. The ballast control system employs a compressor 56 and/or compressed air tanks 58 operably connected to the ballast tanks through valves 60. Water valves 62 controllable by a microprocessor 64 are opened with the air vehicle on the water thereby filling the ballast tanks. Controlled sequencing of the valves may be employed, for example, filling of the ballast tanks 46 to create a tail low condition, followed by filling of ballast tanks 48 for submerging the empennage, with filling of the ballast tanks 52. Natural buoyancy of the pontoons 14a, 14b (which may be supplemented with sealed buoyancy tanks 66 shown in FIG. 7) balances the air vehicle 10 in the pogo position. The ducted fans 22a, 22b and the supplemental buoyancy elements 26 may be rotated as shown to optimize the vertical alignment of the overall air vehicle in the pogo position. Returning to a normal horizontal floating position as seen in FIG. 5 is accomplished by the microprocessor 64 activating the compressor and opening the air valves 60 to blow the ballast tanks followed by closing of the water valves 62 resulting in normal buoyancy of the aft portions 50a, 50b of the pontoons, the pitch/yaw control surfaces 44a, 44b and the supplemental buoyancy elements 26 followed by closing of the water valves 62.

While represented with the side folding wing configuration for the embodiment shown in FIG. 8, the top folding configuration of FIG. 4A or 4B may be similarly employed in the pogo capable arrangement.

Figure 10:
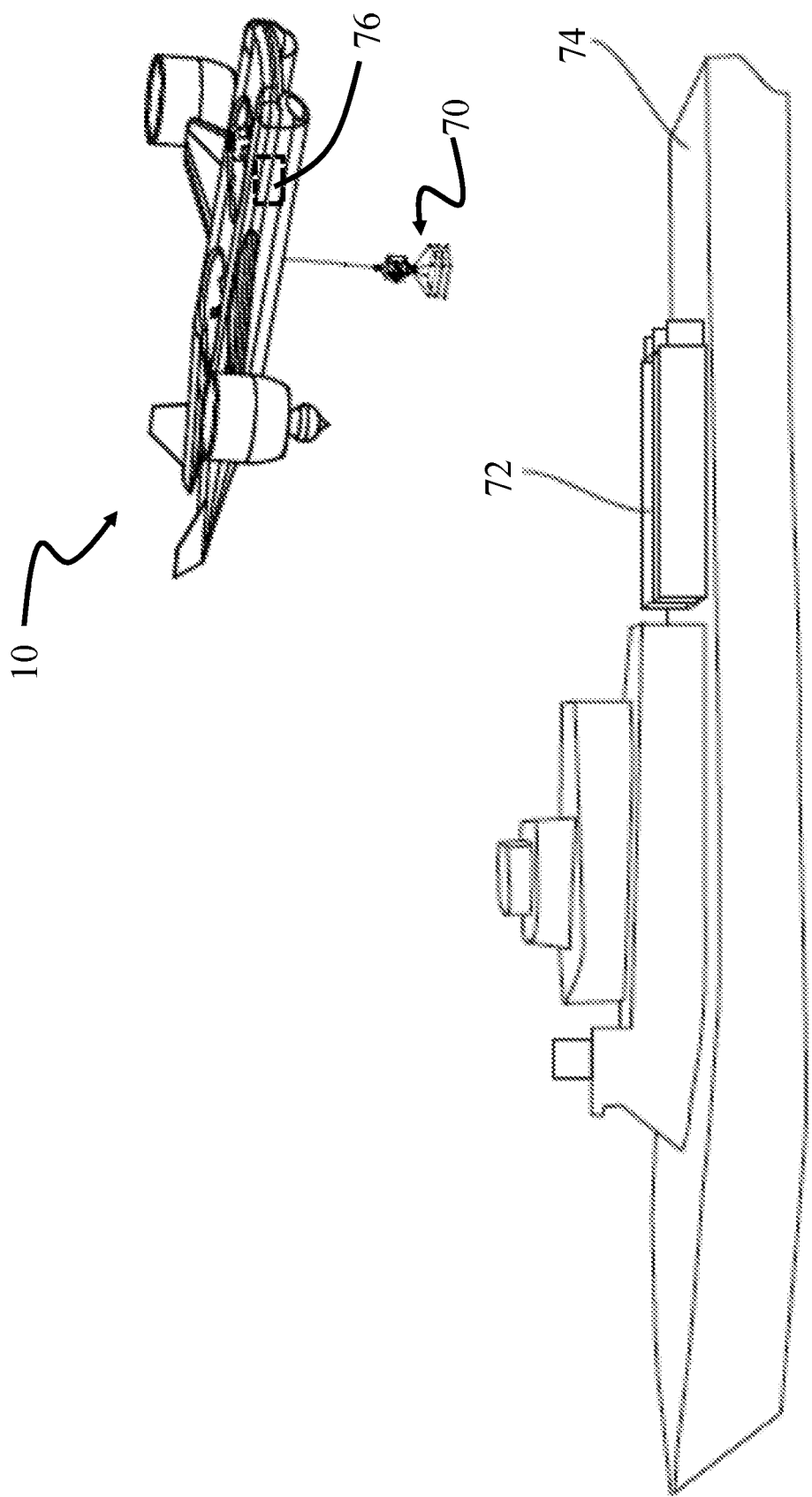
FIG. 10 is a representation of the air vehicle employing motion compensated recovery of surface articles.

Integration of motion compensated recovery of surface articles as disclosed in U.S. Pat. No. 8,591,161 (the disclosure of which is incorporated herein by reference) and shown notionally in FIG. 10, is employed for operational enhancement of the air vehicle 10. Sonobuoys, or similar operational components, or fuel supply canisters may be automatically retrieved using a hoist cable mounted maneuvering system (HCMMS) 70 from containers 72 on ships 74 or prepositioned floating barges.

In an exemplary operational scenario, the air vehicle 10 may employ motion compensated recovery/movement of arrayed Cohesive Sensor Buoys (i.e. intermittent coherent network processing) as a mission asset. Having the flight capability of the air vehicle 10 expands passive/active sonar sensitivity/coverage up to several orders of magnitude while adding above water acoustic sensing with appropriate instrumentation on the air vehicle 10 with a control system 76. Use of collaborative autonomy in the air vehicle 10 leverages mature Open Systems Architecture software for local awareness and remote command and control. Suspended array position and time synchronization challenges are addressed using multiple passive/active sound, light and network techniques. Above water directional acoustic sensing by the air vehicle caches data, preprocesses, monitors, locates and identifies sources. Adaptive software defined radio (SDR) robust networks share data between surface elements. Multi-Mode resilient Position, Navigation and Timing is addressed with robust Position Navigation Time-Targeting (PNT-T) using proven Micro-GCU related technologies. The air vehicle 10, employing Collaborative Autonomy, deploys, enables operations, recovers, transits and redeploys sensor buoy arrays for anti-submarine warfare (ASW), fleet protection, search/rescue and mission/logistics transport operations.

Figure 11:
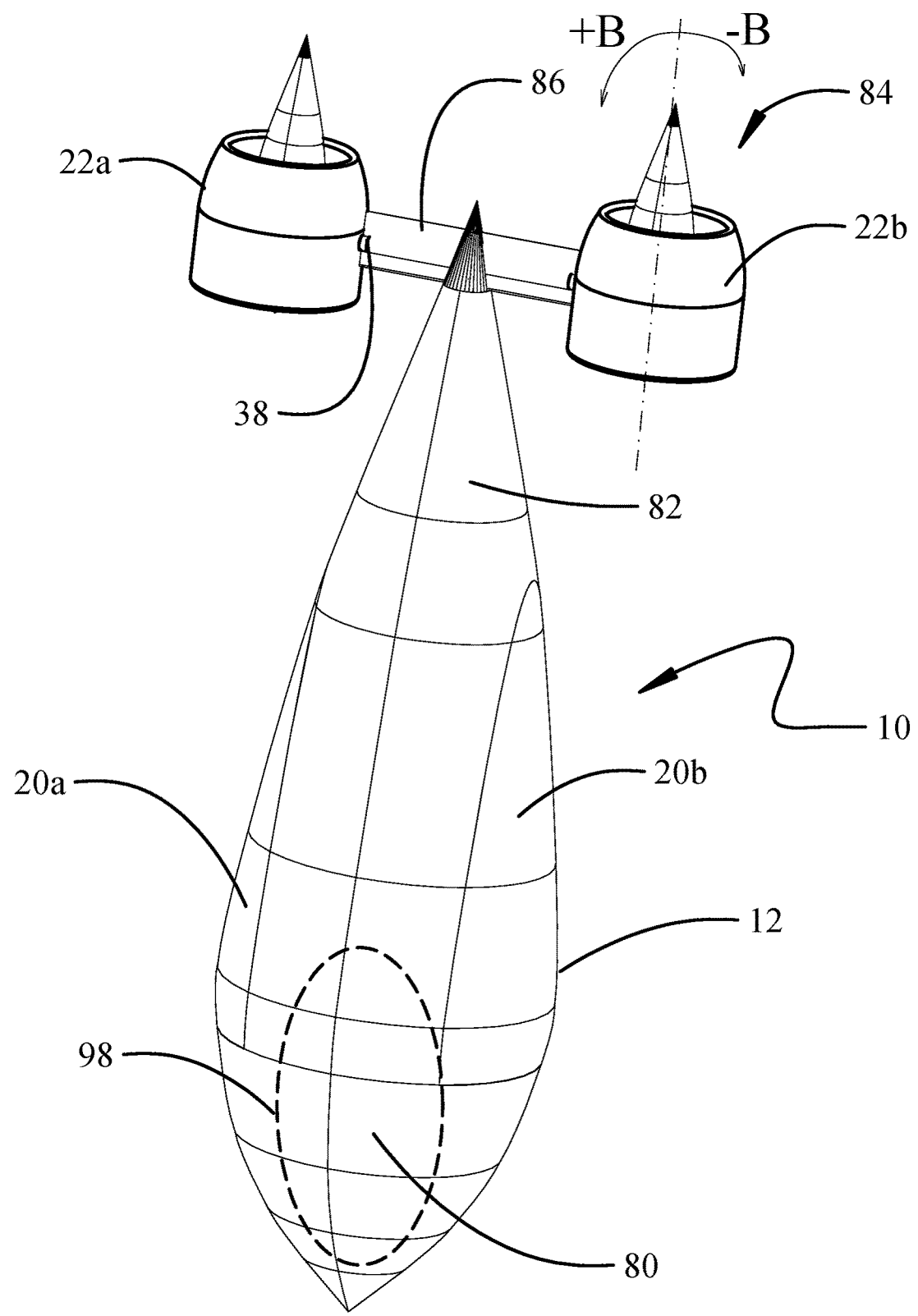
FIG. 11 is a representation of an alternative embodiment of the air vehicle.

In alterative embodiment, the air vehicle 10 is simplified to provide a highly stable semisubmerged pogo arrangement for on surface loitering with a wing deployment design and unique operational scenario for simplified design. Fuselage 12 is shaped with a bulbous forward section 80 tapering to a substantially conical empennage 82. This embodiment with a ballast system to be described in greater detail subsequently, allows the air vehicle to be partially submerged in a pogo orientation with a very smooth exterior surface similar to current ocean buoy designs. This provides a highly stable configuration for on surface loitering even in very high sea states. A propulsion system 84 is mounted to the empennage 82. For the exemplary embodiment, the propulsion system employs two ducted fans 22a, 22b mounted with a horizontal stabilizer 86. As in previously described embodiments, the ducted fans 22a, 22b are mounted with rotating joints 38 and are rotatable through a range of angles, +B through −B, as shown in FIG. 11. Angle and thrust variation of the ducted fans 22a, 22b allows yaw and roll control in vertical or hovering operations. Wings 20a, 20b received in the contour of the fuselage in a folded position are extendible from the fuselage, as will be described in detail subsequently, for horizontal flight operations.

The air vehicle 10 in the embodiment of FIG. 11 operates with transition to a water landing/loiter directly from vertical flight. As the fuselage enters the water a ballast system compensates for any buoyancy of the fuselage to partially submerge the fuselage in a pogo orientation. The propulsion system 84 remains clear of the water and extraction of the air vehicle from the water is accomplished using direct vertical lift with purging of any ballast as the fuselage is withdrawn from the water after extraction. Loitering in place or short range flight operations may be conducted with the propulsion system operating in a vertical flight mode. If extended distance or higher speeds are required, the air vehicle 10 ascends to a predetermined altitude and the wings are unfolded from the fuselage and a rapid descent is initiated to provide aerodynamic lift on the wings and the air vehicle is then recovered from the dive to horizontal flight using standard aerodynamic control and/or thrust vectoring by the propulsion system.

Figure 12A:
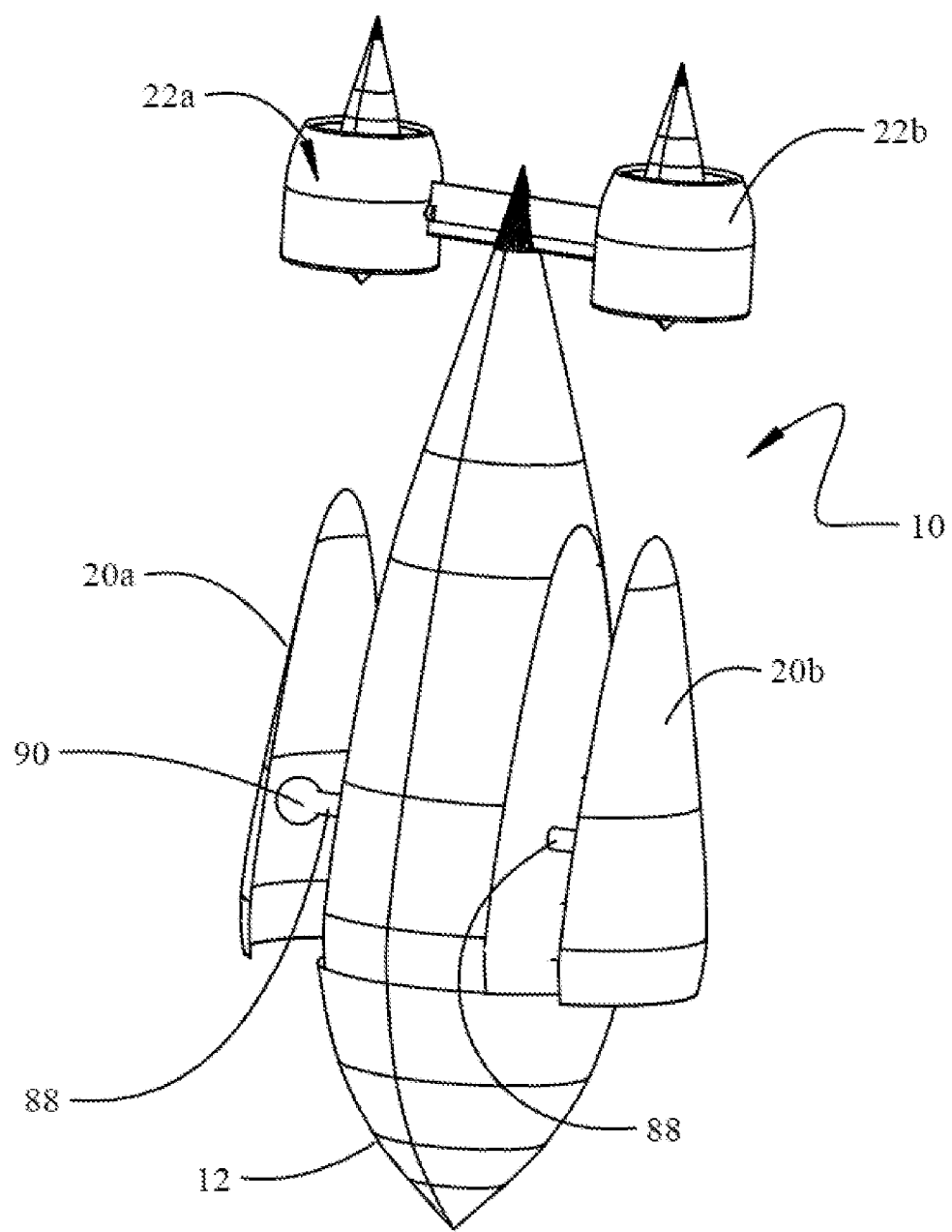
FIG. 12A is a representation of the alternate embodiment with the wings in a first transition position.
Figure 12B:
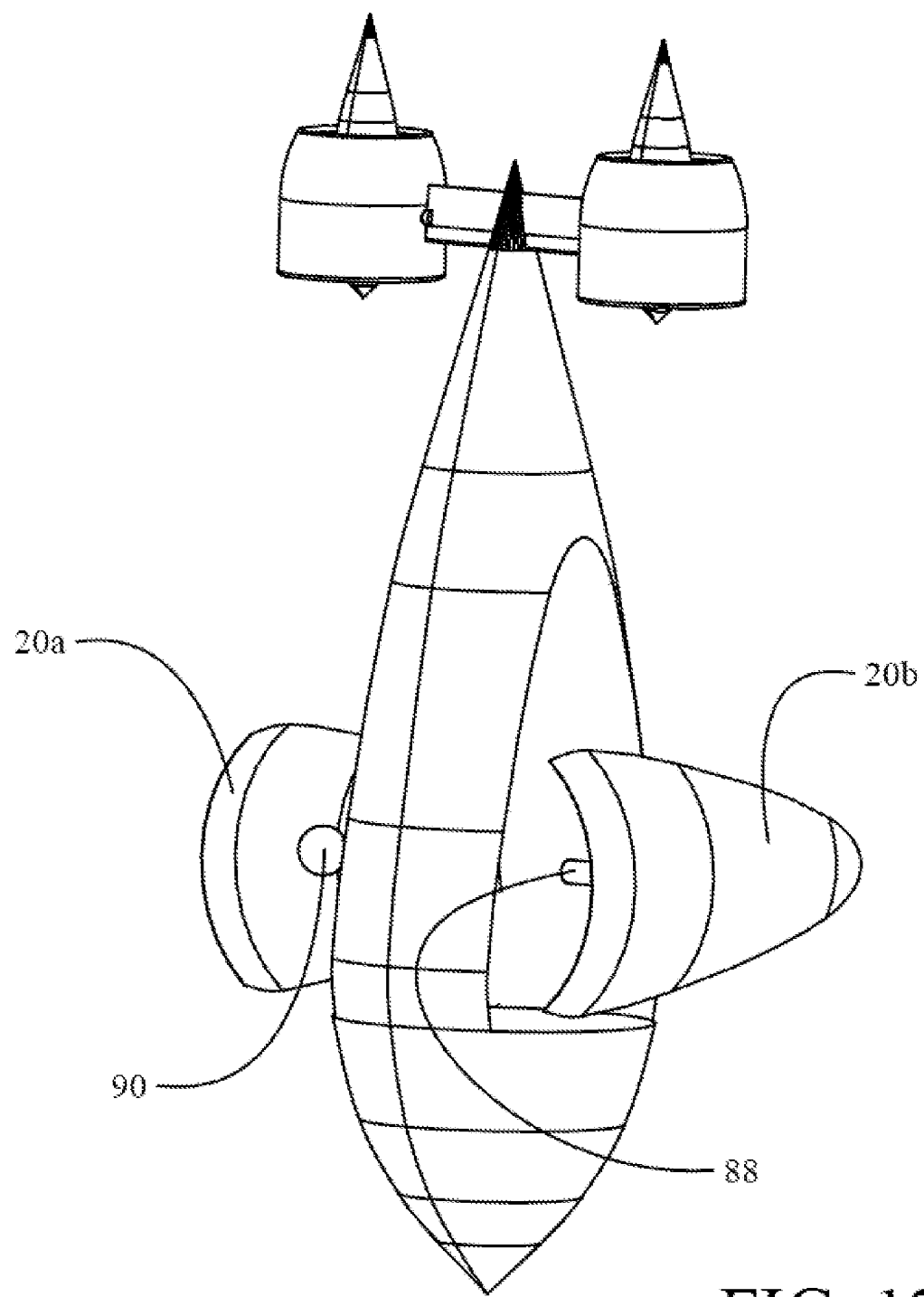
FIG. 12B is a representation of the alternate embodiment with the wings in a second transition position.
Figure 12C:
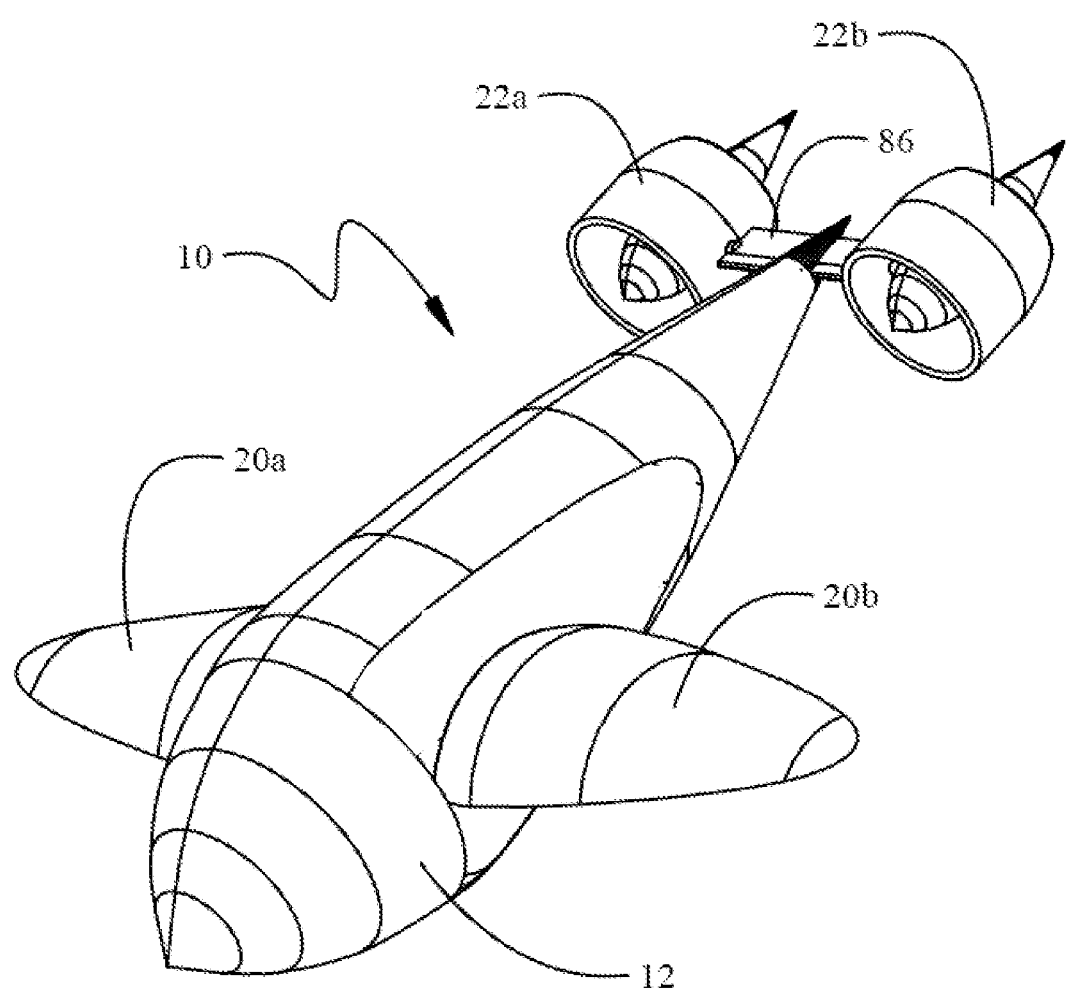
FIG. 12C is a representation of the alternate embodiment with the wings in a horizontal flight position.

As shown in FIG. 12A, wings 20a and 20b are extended from the fuselage on axles 88. The wings 20a, 20b may then be rotated about a first axis on the axles 88 to a secondary position as shown in FIG. 12B followed by rotation about a perpendicular axis using joints 90 to a horizontal flight position as seen in FIG. 12C. The transition steps described with respect to FIGS. 12B and 12C may be reversed in certain operational scenarios. Standard aerodynamic controls such as ailerons may be employed on the wings 20a, 20b or rotation on axles 88 may provide differential lift for roll control. Horizontal stabilizer 84 may be rotatable or include an elevator for aerodynamic pitch control. Angular rotation of ducted fans 22a, 22b may provide thrust vectoring for additional pitch, roll and/or yaw control in the horizontal flight mode Return to vertical flight mode may be accomplished by slowing the air vehicle 10 to produce aerodynamic stall on the wings 20a, 20b with a pendulum recovery by the propulsion system 84 using thrust and angular control of the ducted fans 22a, 22b. The wings 20a, 20b may then be folded into the fuselage reversing the extension operation previously described with respect to FIGS. 12A-12C.

Figure 12D:
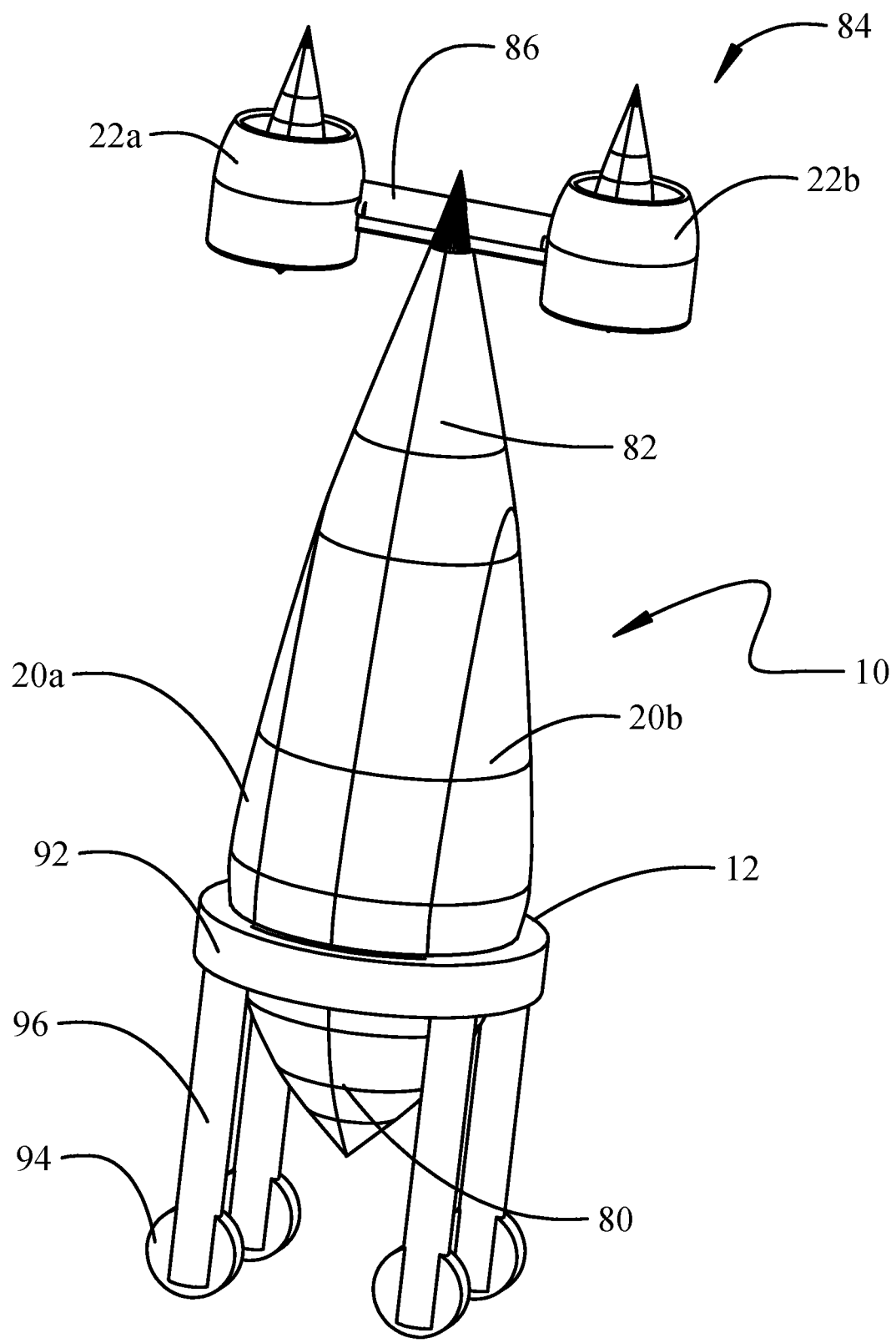
FIG. 12D is a representation of the alternate embodiment in a hard surface landed configuration.

As seen in FIG. 12D, the air vehicle 10 may be operated in vertical flight mode for takeoff and landing on hard surfaces such as ship decks or for land operations. A dolly 92 having wheels 94 and a support frame 96 may be positioned to receive and support the fuselage 12 in a vertical position. Alternatively, wheeled or skid landing gear may be externally or retractably mounted to the air vehicle. The air vehicle may take off vertically from the dolly and land vertically on the dolly. Alternatively, the air vehicle may be landed in the water and retrieved via crane.

Figure 13:
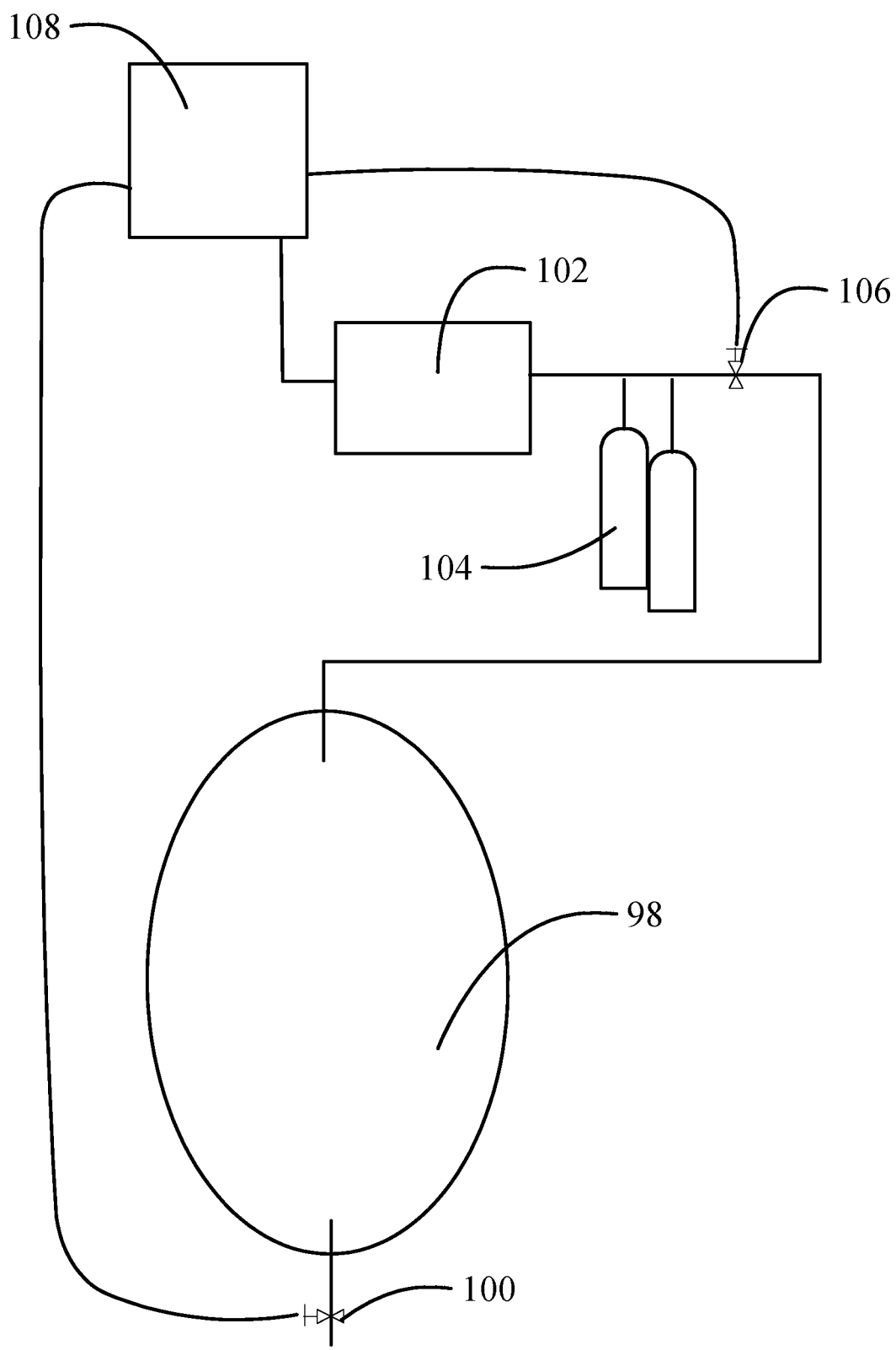
FIG. 13 is a block diagram of the ballast control system for the alternative embodiment.

FIG. 13 shows the simplified ballast control system for the alternative embodiment. A ballast tank 98 (seen in phantom in FIG. 11) supported in the forward section 80 is provided with at least one valve 100 controllable to receive water for flooding the tank to increase ballast for vertical (pogo) orientation in the water. A compressor 102 and/or pressure tanks 104 are provided and connected through a expulsion valve 106 to expel ballast water from the ballast tank as the air vehicle is withdrawn from the water. A microprocessor controller 108 is adapted with control modules for valves 100 and 106, and compressor 102, pressure tanks 104 and valve 106 for ballast intake and expulsion.

Figure 14:
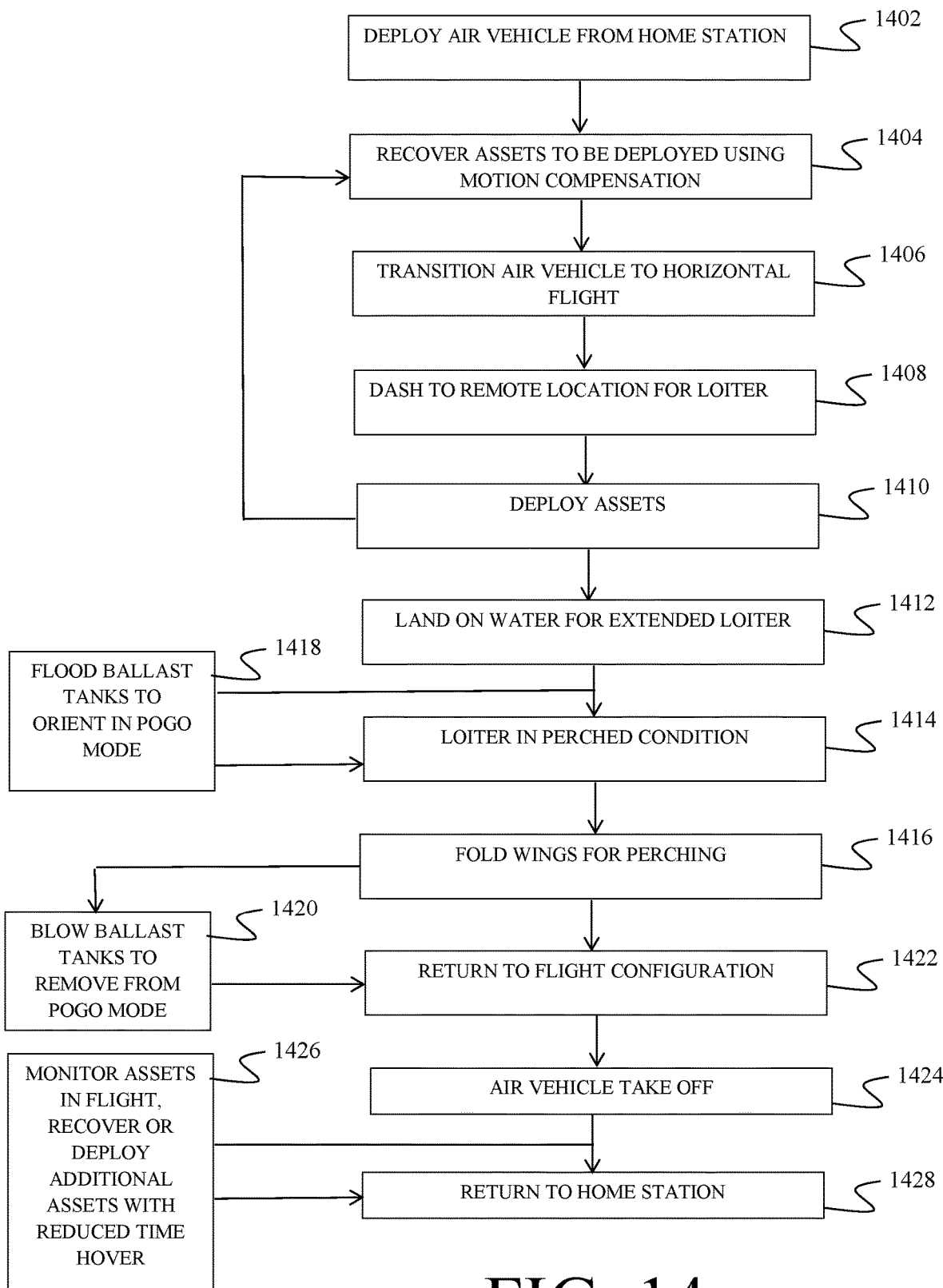
FIG. 14 is a flow chart of a method for operational use of the disclosed air vehicle; and, FIGS. 15A and 15B are a flow chart of a method for operational use of an alternative embodiment of the air vehicle.

FIG. 14 shows a method for operation of an air vehicle as disclosed herein. The air vehicle 10 is deployed from a small ship or other home station by vertical takeoff, step 1402. Motion compensated recovery of assets to be deployed is accomplished, step 1404. The air vehicle then transitions to horizontal flight, step 1406, and dashes to a remote location for loiter, step 1408, or to deploy the assets, step 1410. Steps 1404, 1406 and 1408 may be repeated as necessary for asset deployment. If extended loiter is desired, the air vehicle 10 lands on the water surface, step 1412, and loiters in a perched condition, step 1414. Wings may be folded for perching, step 1416. For extended perching or in high sea states, ballast tanks in the air vehicle may be flooded, step 1418, to orient the air vehicle in a pogo mode. On command or upon preprogrammed mission guidelines, the air vehicle is removed from pogo mode, step 1420, returns to flight configuration, step 1422, and takes off, step 1424. The air vehicle may then monitor assets in flight, recover or deploy assets from/to the sea surface with reduced time hover (including floating fuel canisters), step 1426. Upon mission completion, the air vehicle returns to home station, step 1428.

Figure 15A:
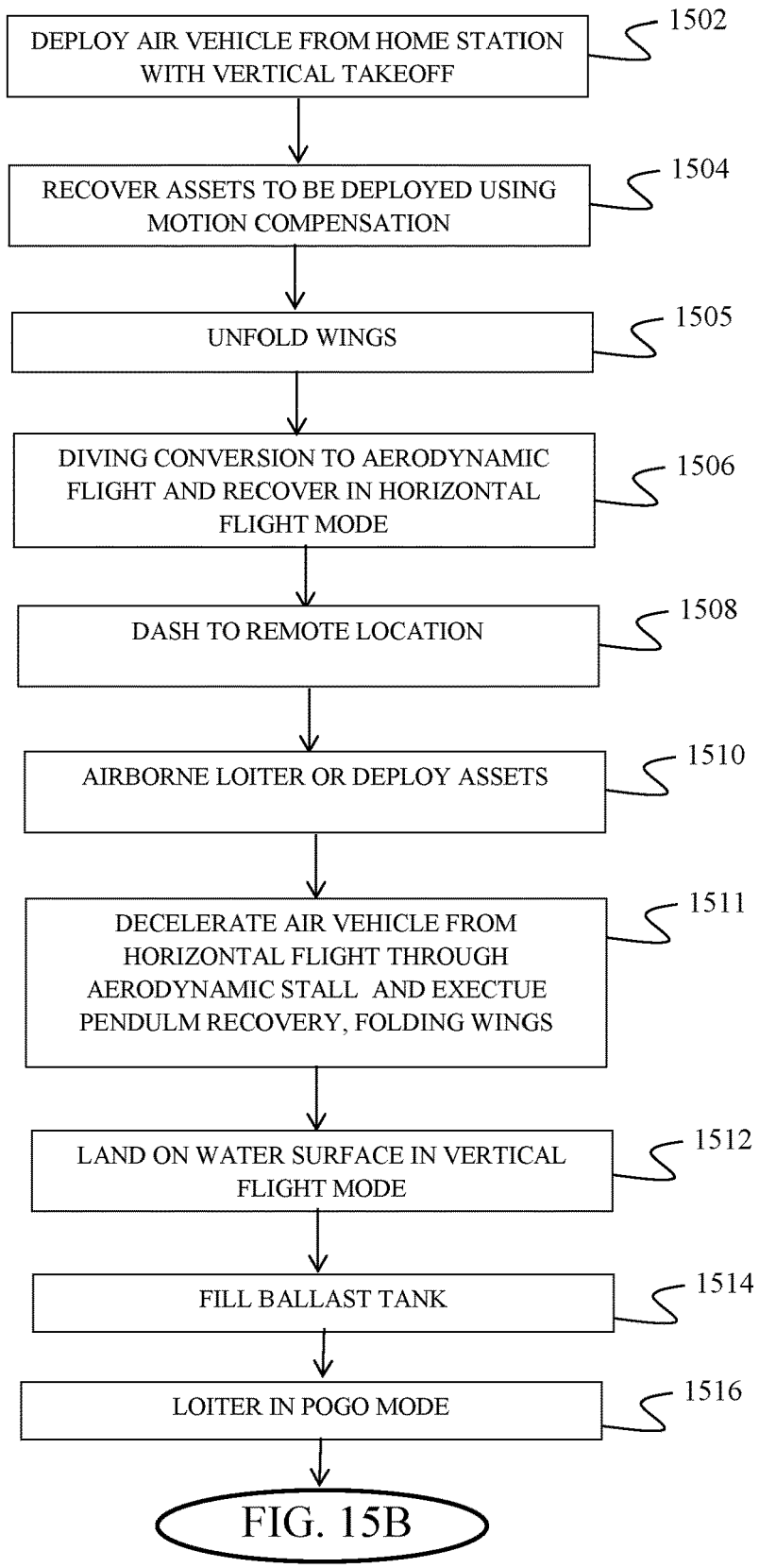
Figure 15B:
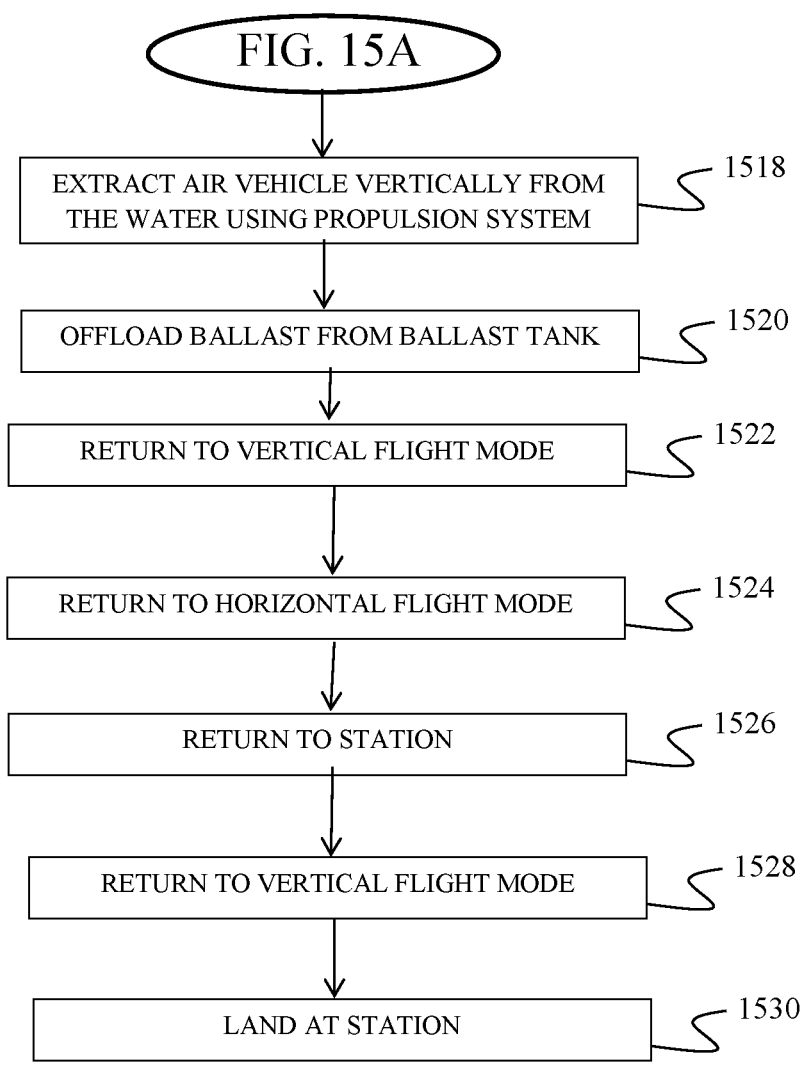

FIGS. 15A and 15B show a method for operation of the alternative configuration of the air vehicle as described herein. The air vehicle 10 is deployed from a small ship or other home station by vertical takeoff, step 1502. Motion compensated recovery of assets to be deployed is accomplished in vertical flight mode, step 1504. The air vehicle then transitions to horizontal flight, as previously described, by unfolding the wings, step 1505, a diving conversion to aerodynamic flight and recovery to a horizontal flight mode, step 1506. The air vehicle then dashes to a remote location, step 1508, for loiter or to deploy the assets, step 1510. If loiter and/or deploy steps are to be accomplished in vertical flight mode, the air vehicle decelerates from horizontal flight through aerodynamic stall and executes a pendulum recovery to vertical flight with folding of the wings, step 1511 as previously described. Steps 1504, 1506, 1508, 1510 and 1511 may be repeated as necessary for asset deployment. If extended loiter is desired, the air vehicle 10 lands on the water surface in vertical flight mode, step 1512, the ballast tank if filled, step 1514 and air vehicle loiters in a pogo condition, step 1516. On command or upon preprogrammed mission guidelines, the air vehicle is extracted vertically from the water using the propulsion system, step 1518, with offloading of ballast, step 1520, and returns to vertical flight mode, step 1522. Return to horizontal flight mode, step 1524 may be accomplished as described in Step 1506 as required. The air vehicle may then return to station, step 1526, return to vertical flight mode, step 1528 as described in step 1511, and land, step 1530.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An air vehicle comprising:
   a fuselage having buoyant stabilizers;
   wings extending from the fuselage, said wings adapted to fold;
   at least one lift fan mounted in the fuselage;
   movable propulsion units carried by the wings, said movable propulsion units rotatable through a range of angles adapted for vertical and horizontal flight operations;
   a plurality of ballast tanks adapted for filling to create rotational negative buoyancy placing the fuselage in a substantially vertical orientation with respect to a water surface; and
   a ballast control system for venting of the ballast tanks to return the fuselage to a substantially horizontal orientation.

2. The air vehicle as defined in claim 1 wherein the buoyant stabilizers are laterally displaced from a vehicle centerline to provide enhanced lateral stability.

3. The air vehicle as defined in claim 2 wherein the buoyant stabilizers comprise at least two pontoons on opposed lateral extents of the fuselage with a deck extending between the pontoons.

4. The air vehicle as defined in claim 1 wherein the at least one lift fan comprises two lift fans longitudinally spaced on a vehicle centerline.

5. The air vehicle as defined in claim 1 wherein the movable propulsion units comprise ducted fans.

6. The air vehicle as defined in claim 5 wherein the ducted fans are mounted to tips of the wings.

7. The air vehicle as defined in claim 5 further comprising supplemental buoyancy elements extending aft of propulsion rotors in the ducted fans.

8. The air vehicle as defined in claim 7 wherein the supplemental buoyancy elements comprises a buoyant chamber supported by a stinger extending from an engine/motor nacelle of a propulsion rotor in the ducted fan.

9. The air vehicle as defined in claim 1 wherein the wings fold onto a deck of the fuselage.

10. The air vehicle as defined in claim 9 wherein the wings are bifurcated on a midspan chord for first folding elements, foldable inward onto the deck of the fuselage, and second folding elements, folding outboard back onto the first folding elements.

11. An air vehicle comprising:
    a fuselage having a bulbous forward section tapering to a conical empennage;
    wings extendable from the fuselage; and,
    movable propulsion units attached to the empennage with a horizontal stabilizer, said movable propulsion units rotatable through a range of angles adapted for vertical and horizontal flight operations, said fuselage submergible in a pogo orientation with insertion into and extraction from water in vertical flight.

12. The air vehicle as defined in claim 11 further comprising:
    a ballast tank in the forward section adapted for filling to create rotational negative buoyancy placing the fuselage in the pogo orientation; and,
    a ballast control system for venting of the ballast tanks.

13. The air vehicle as defined in claim 11 wherein the wings are extendable from the fuselage on axles, the wings rotatable about a first axis on the axles to a secondary position and rotatable on joints about a perpendicular axis to a horizontal flight position.

14. The air vehicle as defined in claim 13 wherein rotation of the wings on the axles provides differential lift for roll control.

15. The air vehicle as defined in claim 13 wherein rotation of the horizontal stabilizer provides aerodynamic pitch control.

16. The air vehicle as defined in claim 13 wherein angular rotation of the propulsion units provides thrust vectoring for pitch, roll or yaw control in the horizontal flight operations.

17. The air vehicle as defined in claim 13 wherein the propulsion units comprise ducted fans.

18. A method for operation an air vehicle comprising:
deploying an air vehicle from a home station by vertical takeoff;
transitioning the vehicle to horizontal flight by vertically ascending to a predetermined altitude, unfolding a wings, diving to convert to aerodynamic flight and recovering to a horizontal flight mode;
dashing to a remote location;
decelerating the air vehicle from horizontal flight through aerodynamic stall and executing a pendulum recovery to vertical flight with folding of the wings;
landing on the water surface in vertical flight mode;
filling a ballast tank;
loitering in a pogo condition;
extracting the air vehicle vertically from the water using the propulsion system;
offloading ballast from the ballast tank; and
returning to vertical flight mode.

* * * * *